(12) United States Patent
Pinto et al.

(10) Patent No.: US 10,655,461 B2
(45) Date of Patent: May 19, 2020

(54) FORMATION PRESSURE DETERMINATION

(71) Applicant: Schlumberger Technology Corporation, Sugar Land, TX (US)

(72) Inventors: Keith Pinto, Houston, TX (US); Olivier Marché, Grabels (FR)

(73) Assignee: Schlumberger Technology Corporation, Sugar Land, TX (US)

(*) Notice: Subject to any disclaimer, the term of this patent is extended or adjusted under 35 U.S.C. 154(b) by 244 days.

(21) Appl. No.: 15/546,007

(22) PCT Filed: Mar. 3, 2016

(86) PCT No.: PCT/US2016/020546
§ 371 (c)(1),
(2) Date: Jul. 25, 2017

(87) PCT Pub. No.: WO2016/153754
PCT Pub. Date: Sep. 29, 2016

(65) Prior Publication Data
US 2018/0023389 A1    Jan. 25, 2018

(30) Foreign Application Priority Data
Mar. 23, 2015  (FR) ........................ 15 52355

(51) Int. Cl.
*E21B 49/00* (2006.01)
*E21B 49/08* (2006.01)
(Continued)

(52) U.S. Cl.
CPC ............ *E21B 49/00* (2013.01); *E21B 47/06* (2013.01); *E21B 49/005* (2013.01);
(Continued)

(58) Field of Classification Search
CPC ........ E21B 49/00; E21B 49/08; E21B 49/005; E21B 47/06; E21B 49/008; E21B 49/087; G01V 9/00
(Continued)

(56) References Cited

U.S. PATENT DOCUMENTS 4,797,821 A * 1/1989 Petak ................ E21B 49/008
702/12
2004/0065477 A1* 4/2004 Paulk ................ E21B 47/06
175/50

(Continued)

OTHER PUBLICATIONS

Proett, et al., "Objectively Quantifying Wireline and Lwd Pressure Test Quality," SPWLA 55 th Annual Logging Symposium, May 22, 2014.
(Continued)

*Primary Examiner* — Marrit Eyassu

(57) ABSTRACT

A method, apparatus, and program product for determining a formation pressure for a reservoir. Measurement data for a pretest of a formation of the reservoir is received. The measurement data is analyzed to determine a last-read event and a corresponding last-read pressure. Derivative data for flow regime identification is determined based at least in part on the measurement data. The derivative data is analyzed to determine a pressure derivative response, and a formation pressure is determined based at least in part on the last-read event, the last-read pressure, and the pressure derivative response.

16 Claims, 29 Drawing Sheets

(51) Int. Cl.
*E21B 47/06* (2012.01)
*G01V 9/00* (2006.01)

(52) U.S. Cl.
CPC ............ *E21B 49/008* (2013.01); *E21B 49/08* (2013.01); *E21B 49/087* (2013.01); *G01V 9/00* (2013.01)

(58) Field of Classification Search
USPC ...................................................... 73/152.02
See application file for complete search history.

(56) References Cited

U.S. PATENT DOCUMENTS

| | | | | |
|---|---|---|---|---|
| 2006/0241867 | A1* | 10/2006 | Kuchuk | E21B 49/00 702/13 |
| 2009/0114009 | A1 | 5/2009 | Thambynayagam et al. | |
| 2009/0139321 | A1 | 6/2009 | Flaum | |
| 2010/0274490 | A1* | 10/2010 | Gok | E21B 49/008 702/12 |
| 2011/0290562 | A1* | 12/2011 | Standifird | E21B 21/08 175/57 |
| 2013/0186688 | A1* | 7/2013 | Rasmus | E21B 47/06 175/48 |
| 2015/0354342 | A1* | 12/2015 | Betancourt | E21B 49/008 702/11 |

OTHER PUBLICATIONS

Gringarten, "Well Test Analysis in Practice," The Way Ahead, vol. 8, No. 2, Dec. 31, 2012, pp. 10-14.
Extended Search Report for the equivalent European patent application 16769294.6 dated Nov. 30, 2018.
International Preliminary Report on Patentability for the equivalent International patent application PCT/US2016/020546 dated Oct. 5, 2017.
International Search Report and Written Opinion for the equivalent International patent application PCT/US2016/020546 dated Jul. 28, 2016.
Communication pursuant to Article 94(3) for the counterpart European patent application 16769294.6 dated Jan. 27, 2020.

* cited by examiner

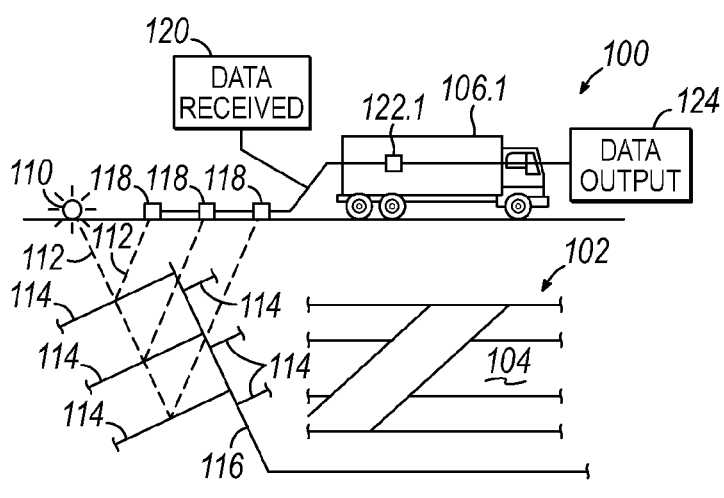
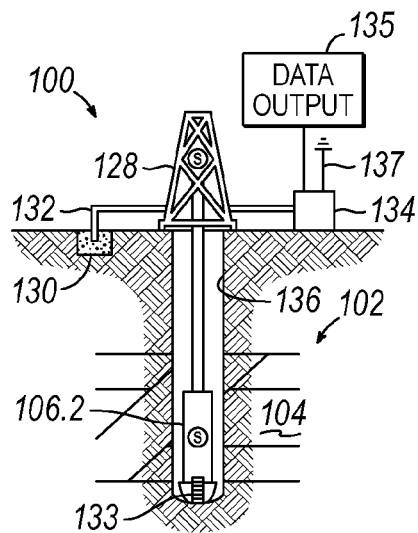
FIG. 2A  FIG. 2B
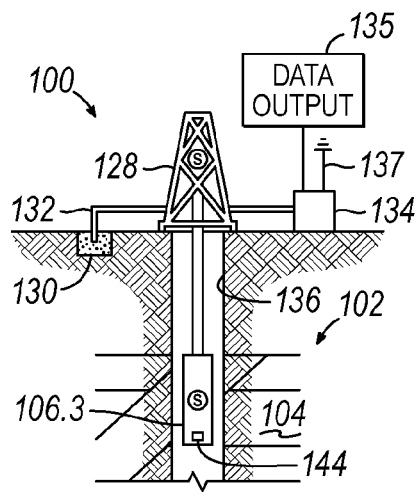
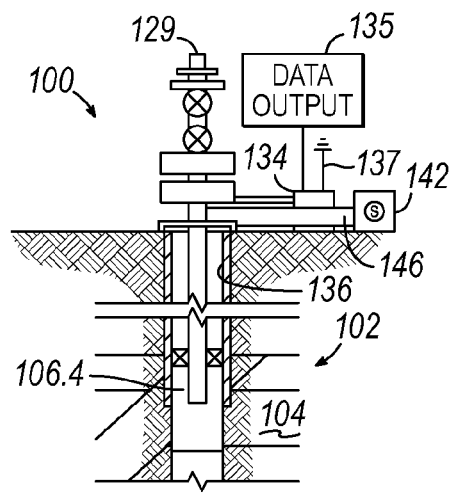
FIG. 2C  FIG. 2D

FORMATION PRESSURE DETERMINATION

CROSS-REFERENCE TO RELATED APPLICATIONS

This application claims priority to France Application having Serial No. 1552355, filed on Mar. 23, 2015. The entirety of this application is incorporated by reference herein.

BACKGROUND

Generally, in oil and gas reservoirs, formation pressure for a well of a reservoir is directly related to performance of the well. As will be appreciated, formation pressure generally corresponds to flow of fluids for a well, where such fluids may include hydrocarbons. Therefore, formation pressure is an important attribute for determining performance of a well, as well as determining relevant recovery strategies to implement for the well. Generally, data acquisition tools (e.g., downhole sensors, measurement tools, etc.) may be used to collect measurement data for a well, where such measurement data may be analyzed to determine various properties for the reservoir, well, and/or formations thereof.

Computer based systems and methods are increasingly being used to aid analyzing reservoir and well properties. However, conventional systems and methods generally rely on input and analysis from oil and gas system professionals, and such conventional systems and methods generally provide limited reservoir characteristics, which must then be interpreted by such oil and gas system professionals. Therefore, a need continues to exist in the art for improved computer based systems and methods for modeling, managing, and analyzing oil and gas reservoirs.

SUMMARY

Embodiments disclosed herein provide systems, methods, and computer program products that determine formation pressures associated with an oil and gas reservoir. Measurement data for a pretest is received from a data acquisition tool, where the measurement data is collected during a pretest of a formation of the reservoir. The measurement data is analyzed to determine a last-read event and a corresponding last-read pressure for the pretest. Derivative data for flow regime identification is determined based on the measurement data, and the derivative data is analyzed to determine a pressure derivative response. A formation pressure is determined for the formation based at least in part on the last-read event, the last-read pressure, and the pressure derivative response.

These and other advantages and features are set forth in the claims annexed hereto and forming a further part hereof. However, for a better understanding of subject matter described herein, and of the advantages and objectives attained through its use, reference should be made to the Drawings, and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate various embodiments, and, together with a general description given above and the detailed description of some embodiments given below, serve to explain some embodiments.

FIGS. 2A-2D illustrate simplified, schematic views of an oilfield having subterranean formations containing reservoirs therein in accordance with implementations of various technologies and techniques described herein.

DETAILED DESCRIPTION

Figure 1:
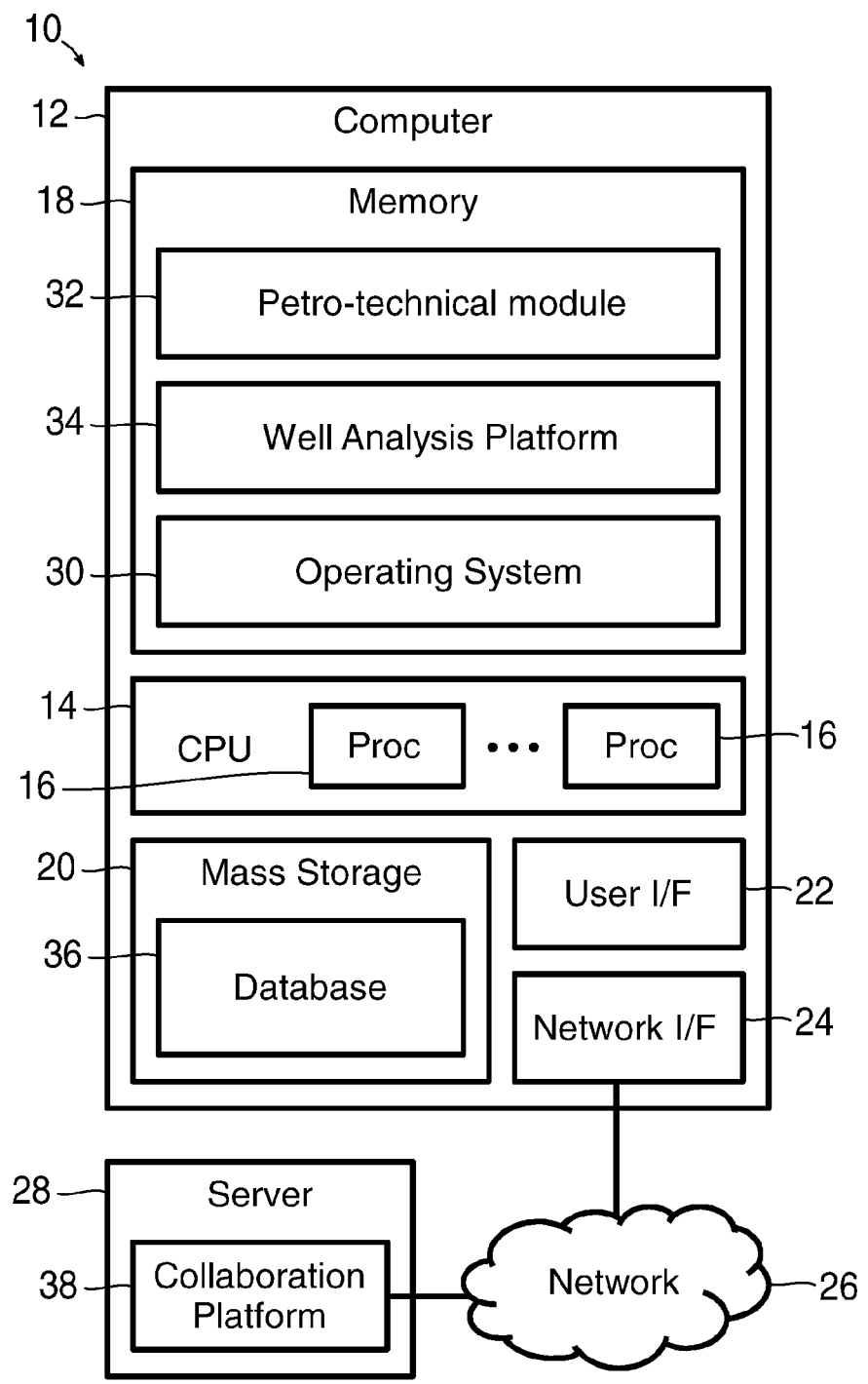
FIG. 1 is a block diagram of an example hardware and software environment for a data processing system in accordance with implementation of various technologies and techniques described herein.

The herein-described embodiments provide methods, systems, and computer program products that determine formation pressures associated with an oil and gas reservoir. Consistent with some embodiments, a data processing system may receive measurement data from a data acquisition tool that is collecting measurement data for a formation of the reservoir. As will be appreciated, while reference is made to a single data acquisition tool, embodiments are not so limited. In some embodiments, one or more data acquisition tools, such as downhole sensors, downhole measurement tools, formation testers, wireline formation tools, probes, etc., may collect measurement data for the reservoir that may be received and analyzed by the data processing system to determine one or more formation pressures associated with the reservoir.

For example, data acquisition tools may be positioned at different depths (also referred to as stations) in a wellbore associated with the reservoir such that measurement data may be collected at each station for a formation associated with the reservoir. In this example, a formation pressure for the formation may be determined for each station consistent with embodiments described herein. As will be appreciated, the formation pressure for each station may be analyzed to determine a formation pressure gradient for the formation, where the formation pressure gradient indicates formation pressure at various depths (i.e., the various stations). Additional characteristics of the formation and/or the reservoir may be determined based at least in part on the determined formation pressures. Therefore, determining an accurate formation pressure (or formation pressures at various stations) is valuable information when analyzing an oil and gas reservoir.

Generally, a data acquisition tool may perform one or more tests of a formation of a reservoir to collect time-related measurement data. Some tests conducted for a formation are short in duration and may be referred to as "pretests". For a pretest, a small volume of fluid may be withdrawn from the formation with a data acquisition tool (e.g., a probe), and time related measurement data that includes drawdown and buildup pressure data is collected for each pretest. A pretest generally includes a small pressure drawdown and a resulting pressure buildup that ends with a last-read pressure. As will be further appreciated, pretests may be performed sequentially by a data acquisition tool such that time related measurement data may be collected for each pretest, and measurement data from one or more related pretests may be analyzed for determining formation pressure. Based on the measurement data, pretest pressure events such as mud before, begin drawdown, start buildup, last-read, and/or mud-after pressure events may be identified. The identification of the last-read pretest pressure event may be used to determine formation pressure for the well. Generally, a pressure measured at the identified last-read event (referred to as a last-read pressure) may correspond to the formation pressure. However, based on various characteristics of the formation, positioning of the data acquisition tool, and/or other such factors the last-read pressure may not be an accurate measurement of formation pressure.

Therefore, in some embodiments, collected measurement data may be analyzed to determine whether the last-read pressure is an accurate for determining formation pressure. Specifically, a data processing system may analyze the measurement data to determine derivative data for a flow identification regime, and a pressure derivative response for the well may be determined from the derivative data. The pressure derivative response may be analyzed to determine if the last-read pressure is accurate for determining the formation pressure. If the last-read pressure is determined to not be accurate for determining formation pressure, embodiments may adjust the last-read pressure and/or determine the formation pressure based at least in part on the derivative data and/or the pressure derivative response.

Other variations and modifications will be apparent to one of ordinary skill in the art.

Hardware and Software Environment

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc. Additionally, a computer 12 may be in communication with one or more data acquisition tools, sensors, surface production network components, and/or other such devices that may be implemented in oil and gas recovery and/or exploration operations.

A computer 12 generally operates under the control of an operating system 30 and executes or otherwise relies upon various computer software applications, components, programs, objects, modules, data structures, etc. For example, a petro-technical module or component 32 executing within a reservoir and/or well analysis platform (also referred to herein as well analysis platform) may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, the well analysis platform 34 may implemented and/or in communication with one or more of the following: the MAXWELL acquisition software platform, the INSITU Pro software platform, the PD-PLOT software platform, the TECHLOG software platform, GEOFRAME software platform, and AVOCET software platform, while collaboration platform 38 may be implemented as the OCEAN platform and STUDIO E&P KNOWLEDGE ENVIRONMENT platform, which are available from Schlumberger Ltd. and its affiliates. It will be appreciated, however, that the techniques discussed herein may be utilized in connection with other platforms and environments, so embodiments are not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the description applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment. However, it should be appreciated that any particular program nomenclature that follows is used merely for convenience, and thus embodiments should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that embodiments are not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, embodiments are not limited to the particular sequences of operations described herein.

Those skilled in the art will recognize that the example environment illustrated in FIG. 1 is not intended to be limiting. Indeed, those skilled in the art will recognize that other alternative hardware and/or software environments may be used without departing from the subject matter disclosed herein.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing by the data processing system 10 and/or other such systems. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102. Wireline tool 106.3 may be configured to collect measurement data for one or more pretests consistent with some embodiments.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition, pressure, and/or other parameters of the field operation, well/wellbore, and/or reservoir.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
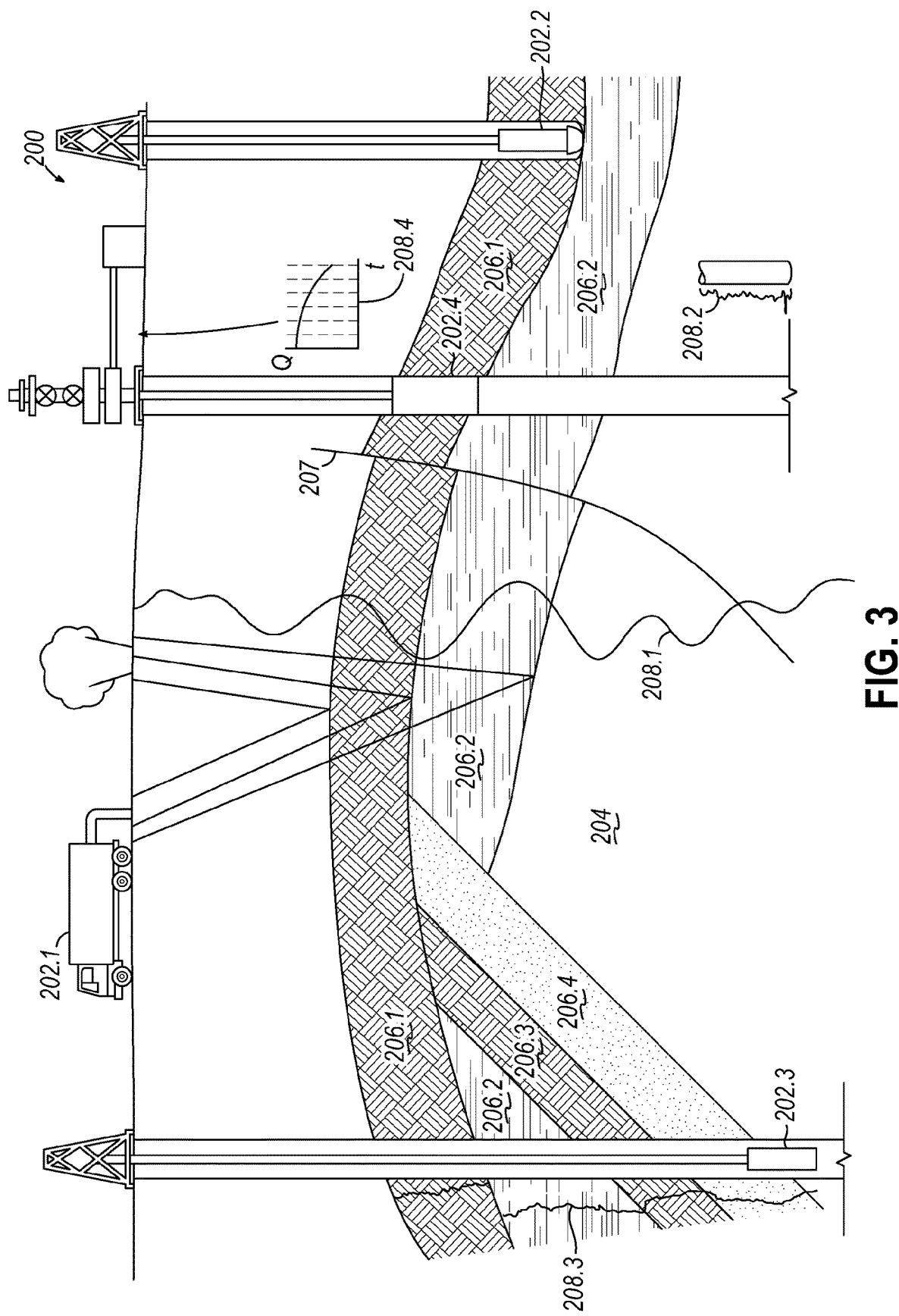
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations. As will be appreciated, data acquisition tools 202.1-202.4 may collect measurement data for analysis consistent with embodiments discussed herein.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
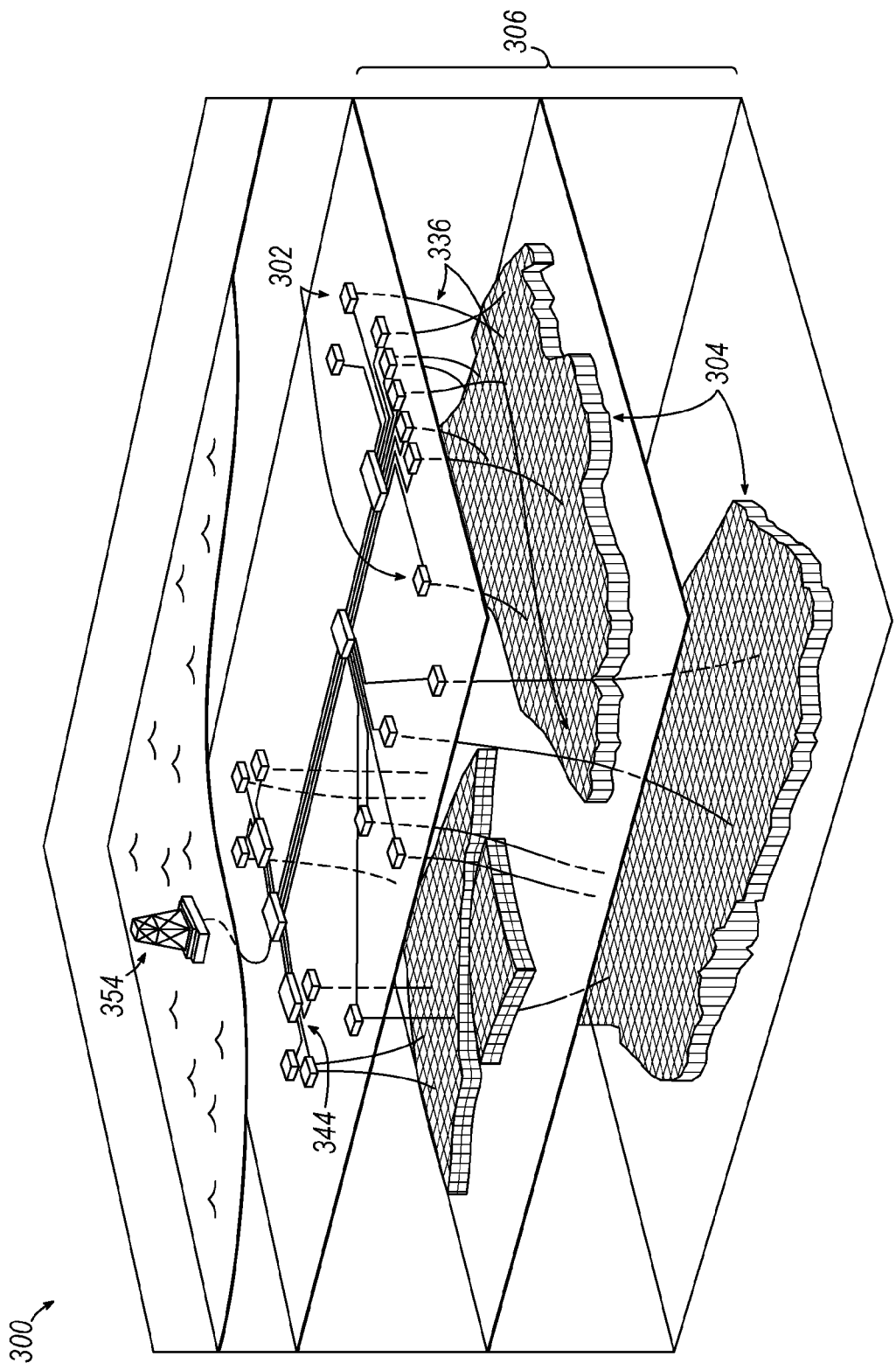
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Formation Pressure Determination

Consistent with some embodiments, a formation pressure associated with a reservoir may be determined. Generally, a pressure derivative response may be determined from measurement data collected during a pretest of a formation of the reservoir, and the formation pressure may be determined based at least in part on the pressure derivative response. By determining the formation pressure based at least in part on the pressure derivative response determined from the measurement data, embodiments may address wellbore condition issues, data acquisition tool positioning issues, formation permeability issues, and/or other such factors that may cause difficulty in determining formation pressure from measurement data.

Figure 5:
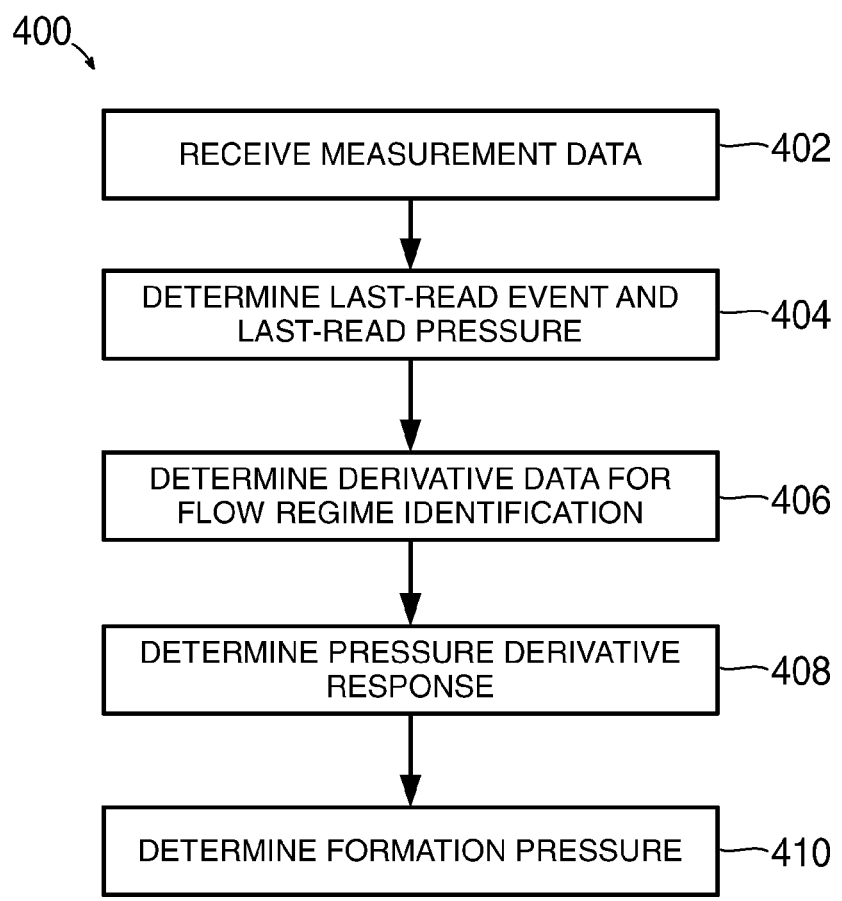
FIG. 5 provides a flowchart that illustrates a sequence of operations that may be performed by the data processing system of FIG. 1 to determine a formation pressure.

FIG. 5 provides a flowchart 400 that illustrates a sequence of operations that may be performed by the data processing system 10 to determine a formation pressure associated with an oil and gas reservoir consistent with some embodiments. As shown, the data processing system 10 receives measurement data (block 402) collected from a formation of the reservoir. Generally, the measurement data may be collected by a data acquisition tool positioned in a wellbore associated with the reservoir, such as a probe and/or wireline tool. Furthermore, the measurement data is generally collected during one or more short tests referred to as pretests, where, during such pretests, the data acquisition tool collects time related pressure data and/or other such information for the formation. For a pretest, the time-related measurement data may be analyzed to identify one or more events during the pretest. The events that may be identified in a pretest by analysis of the measurement data may include, for example, a mud before event, a begin drawdown event, a start buildup event, a last-read event, and a mud after event. The data processing system 10 analyzes the measurement data to determine a last-read event and a corresponding last-read pressure for the formation for the pretest (block 404).

The data processing system determines derivative data for a flow regime identification based at least in part on the measurement data (block 406). Consistent with some embodiments, time related pressure data of the measurement data may be analyzed to determine derivative data that may be used for flow regime identification, where such derivative data may include spherical derivative data and/or radial derivative data. The derivative data generally indicates a rate of pressure change with respect to a selected time function. Analysis of such derivative data may be performed to identify different flow regimes associated with fluid collected during the pretest. At different times during a pretest, a flow of fluid being collected by the data acquisition tool varies, where the behavior of the flow may be described as a flow regime. Flow regimes encountered by a data acquisition tool during a pretest may include a spherical flow regime, a hemispherical flow regime, a radial flow regime, a flow around an obstacle flow regime, and/or a low permeability streak flow regime.

In general, identification of the flow regime at different times during the pretest comprises identifying characteristic patterns in the derivative data. For example, during a buildup period for the data acquisition tool, a pressure disturbance from the data acquisition tool causes fluid to flow in a spherical flow regime. When the pressure disturbance encounters an impermeable barrier in the formation of the well, the spherical flow regime is altered and becomes a hemispherical flow regime. When the pressure disturbance of the data acquisition tool encounters a second impermeable barrier (e.g., a vertical barrier), the fluid flows in a radial flow regime. Therefore, the data processing system 10 analyzes the derivative data to determine a pressure derivative response for the pretest (block 408). Generally, determining the pressure derivative response for the pretest includes identifying a portion of the pretest that corresponds to a spherical flow regime and/or identifying a portion of the pretest that corresponds to a radial flow regime. Furthermore, consistent with some embodiments, determining a pressure derivative response may comprise determining a pressure versus spherical time function based on the measurement data and/or determining a pressure versus radial time function based on the measurement data.

Based on the last-read event, the last-read pressure, and/or the pressure derivative response, the data processing system 10 determines the formation pressure corresponding to the reservoir (block 410). Consistent with some embodiments, the data processing system 10 may determine that the last-read pressure is an accurate measurement of formation pressure. However, in some embodiments, based on the pressure derivative response, the data processing system 10 may determine that the last-read pressure is not an accurate measurement of formation pressure. Permeability of a formation, positioning of the data acquisition tool with respect to the formation, poor conditions of a wellbore, and/or other such factors may result in the last-read pressure not being an accurate measure of formation pressure. The data processing system 10 may analyze the pressure derivative response to adjust the last-read pressure to improve the accuracy in determining the formation pressure.

As will be appreciated, while the flowchart 400 of FIG. 5 is directed to determination of a formation pressure from a pretest conducted by a data acquisition tool, embodiments may generally collect measurement data from a plurality of data acquisition tools positioned at various depths of a wellbore associated with the reservoir (referred to as positions) such that a formation pressure may be determined for each station and a formation pressure gradient may be determined. A formation pressure gradient generally corresponds to formation pressure at various depths. Therefore, embodiments may determine a plurality of formation pressures for a formation of a reservoir where the formation pressures may be determined at various depths (i.e., stations) of a wellbore associated with the reservoir.

Figure 6:
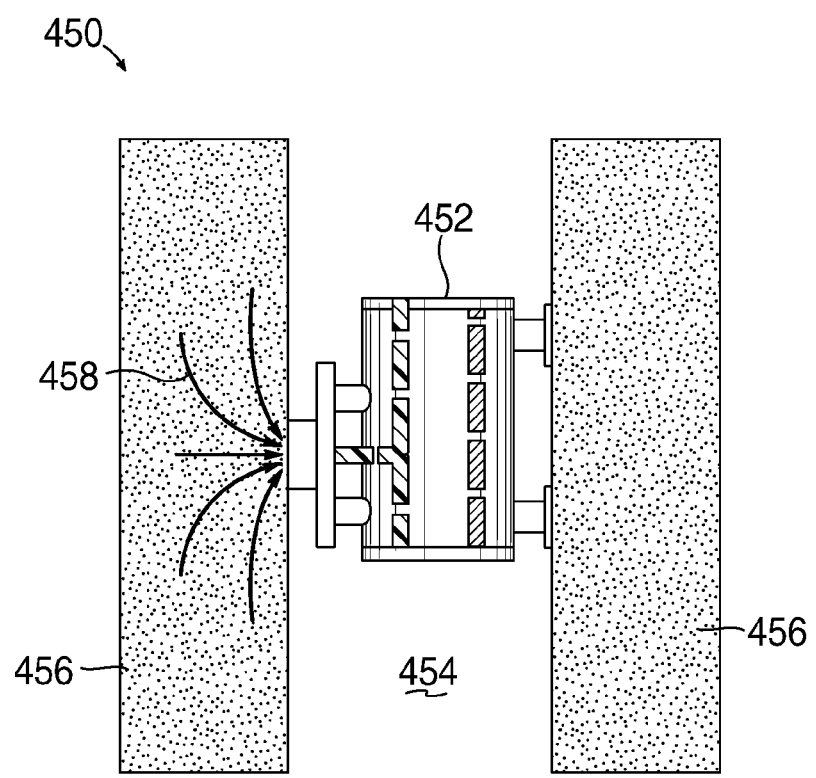
FIG. 6 provides a diagrammatic illustration of a data acquisition tool positioned in a wellbore associated with a reservoir and configured to collect measurement data from a formation of the reservoir for analysis by the data processing system of FIG. 1.
Figure 7A:
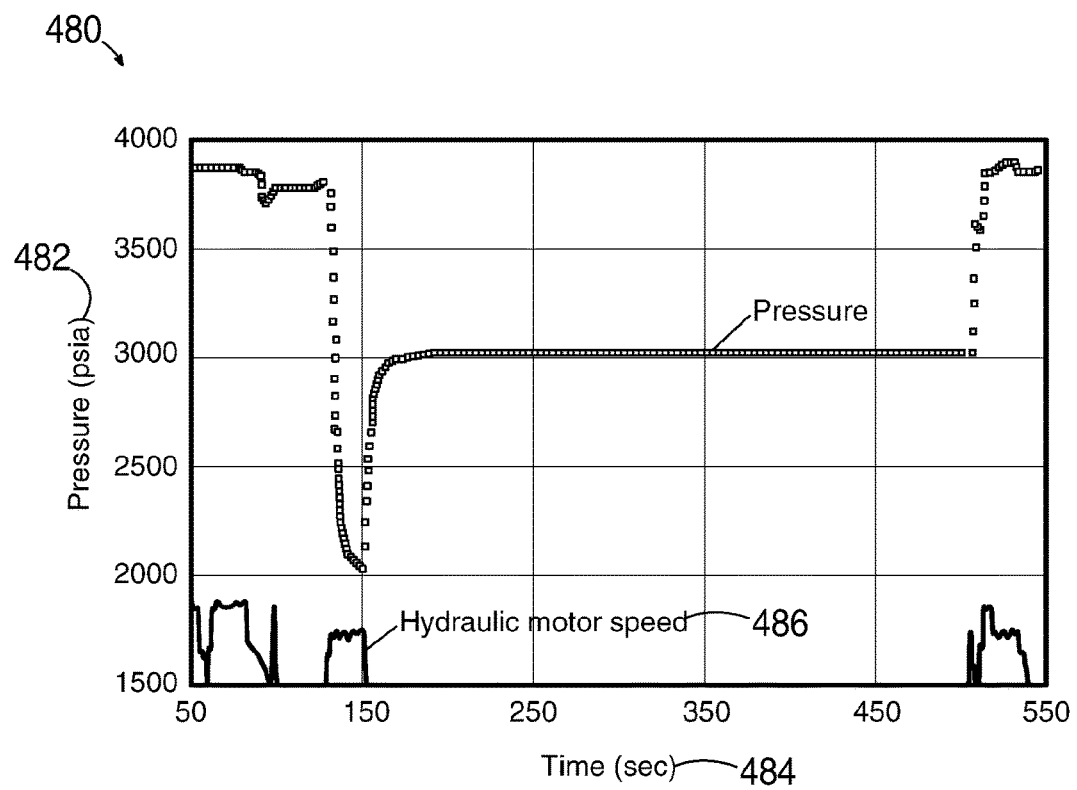
FIG. 7A provides an example chart that illustrates measurement data that may be received by the data processing system of FIG. 1.
Figure 7B:
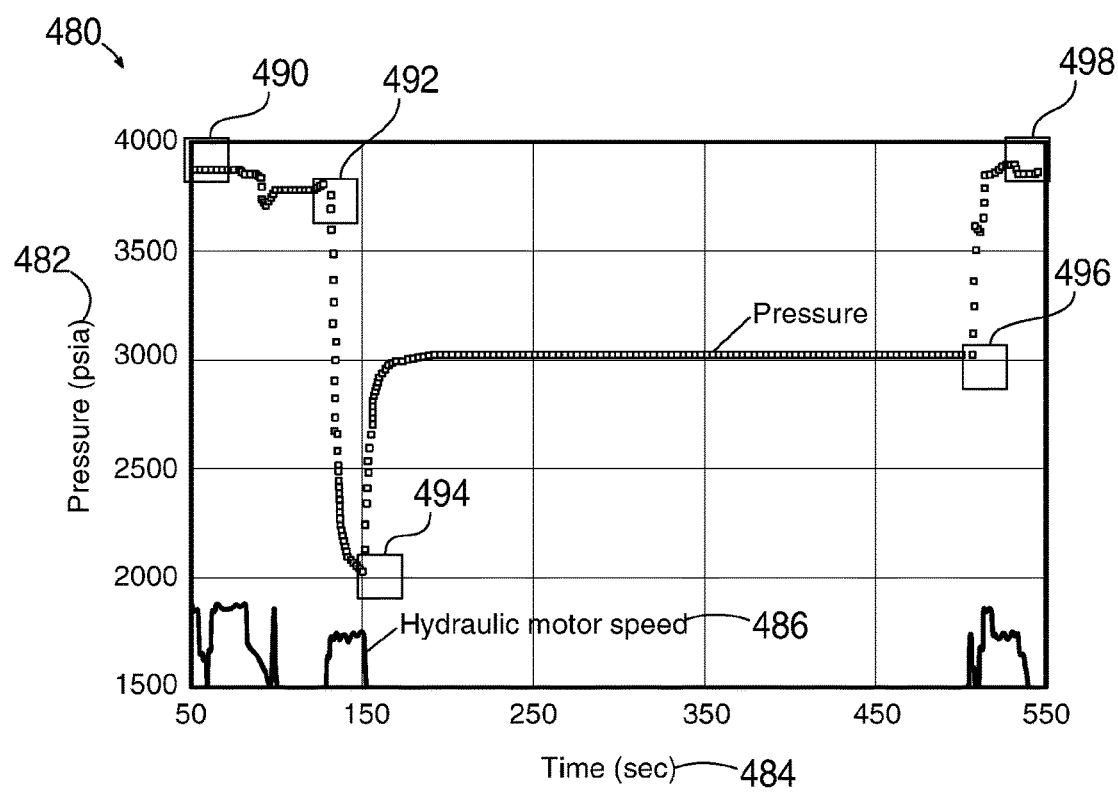
FIG. 7B provides an example chart that illustrates the measurement data of FIG. 7A and includes various events that may be determined by analysis of the measurement data by the data processing system of FIG. 1.

FIG. 6 provides an example diagrammatic illustration of a well 450 associated with a reservoir and a data acquisition tool 452 in a wellbore 454 of the well 450, where the data acquisition tool 452 is positioned such that the data acquisition tool 452 may perform a pretest on a formation 456 of the well 450. In this example, the data acquisition tool 452 collects fluid from the formation 456 for the pretest and collects measurement data related to pressure and time during the pretest. As shown, the fluid may flow from the formation 456 to the data acquisition tool 452 in a manner similar to the flow lines 458 illustrated in the example. FIG. 7A provides a chart 480 that illustrates example measurement data that may be collected during a pretest. In this example, the measurement data includes pressure data 482 collected for a time period 484 of the pretest, and the measurement data further includes time-related motor speed 486 for the data acquisition tool. FIG. 7B provides the example chart 480 of FIG. 7A that includes annotations corresponding to different events that may occur during a pretest consistent with some embodiments. In particular, FIG. 7B includes an annotation corresponding to a mud-before event 490, a start drawdown event 492, a start buildup event 494, a last-read event 496, and a mud-after event 498. As will be appreciated, in some embodiments, the last-read event 496 may therefore be determined to correspond to a particular time and particular pressure (referred to as the last-read pressure) by analyzing time-related pressure data included in received measurement data.

Figure 8A:
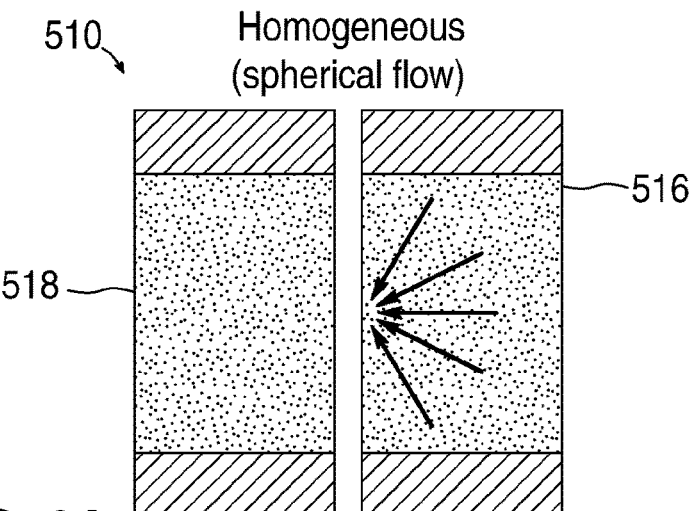
FIGS. 8A-8C provide diagrammatic illustrations of flow regimes for fluids that may be exhibited in measurement data analyzed by the data processing system of FIG. 1.
Figure 8B:
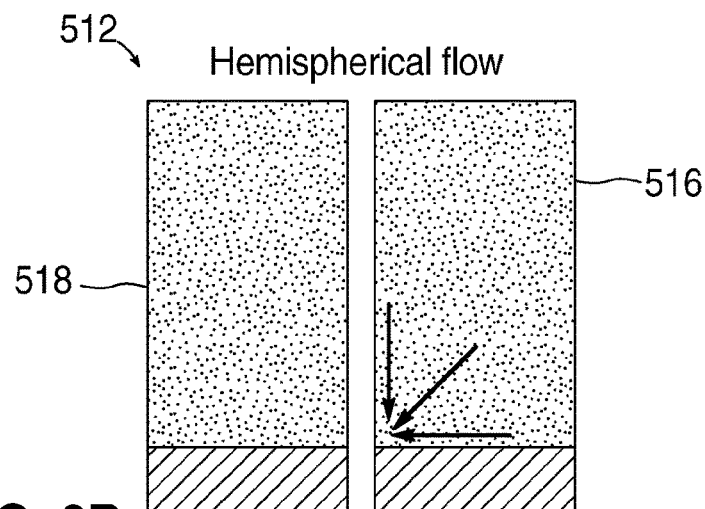
Figure 8C:
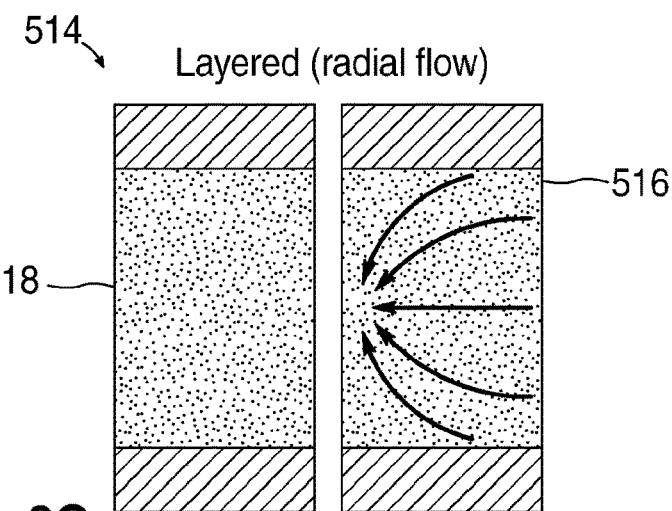

FIGS. 8A-8B provide example diagrammatic illustrations of example fluid flow regimes 510-514 that may occur during a pretest of a formation 516 by a data acquisition tool 518. Referring to FIG. 8A, a spherical flow regime 510 may occur during a buildup period for the pretest. As shown, a pressure disturbance by the data acquisition tool 518 causes fluid from the formation 516 to propagate spherically until an impermeable barrier is reached. In some high permeability formations, a first impermeable barrier is reached so quickly that the measurement data and pressure derivative data derived therefrom may not reflect a spherical flow regime in a pressure derivative response. In FIG. 8B, a first impermeable barrier of the formation 516 has been encountered by the pressure disturbance of the data acquisition tool 518 causing the fluid flow to transition to a hemispherical flow regime 512. In FIG. 8C, when, or if a second impermeable barrier of the formation 516 is reached by the pressure disturbance, the flow regime of the fluid transitions from a hemispherical flow regime to a radial flow regime 514.

Figure 9:
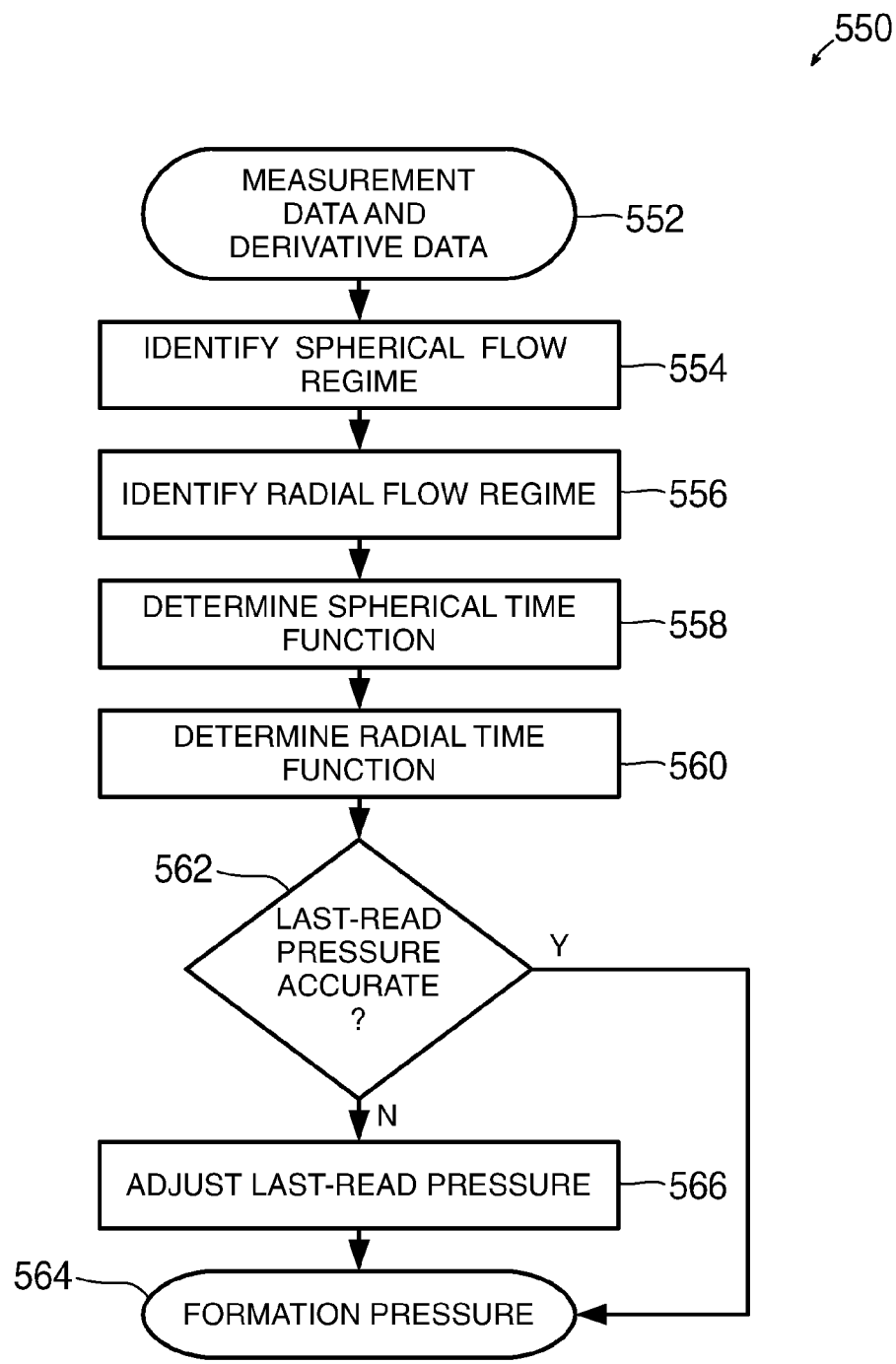
FIG. 9 provides a flowchart that illustrates a sequence of operations that may be performed by the data processing system of FIG. 1. to determine a formation pressure.

FIG. 9 provides a flowchart 550 that illustrates a sequence of operations that may be performed by the data processing system 10 to determine and analyze derivative data of the measurement data 552 consistent with some embodiments. As shown, based on the measurement data and/or derivative data 552, the data processing system identifies a portion of the pretest that corresponds to a spherical flow regime based at least in part on the pressure derivative data (block 554). As will be appreciated, the derivative data may include spherical derivative data and/or radial derivative data, and a portion of the pretest corresponds to a spherical flow regime when the spherical derivative data exhibits a flat trend (e.g., a slope approximate to zero) while the radial derivative data exhibits a slope of approximately $$\left(-\frac{1}{2}\right).$$

Therefore, the data processing system 10 may identify at least a portion of the spherical derivative data that exhibits a flat trend to thereby identify a portion of the pretest that corresponds to a spherical flow regime. The data processing system may identify a portion of the pretest that corresponds to a radial flow regime based at least in part on the radial derivative data (block 556). Generally, a portion of the pretest corresponds to a radial flow regime when the radial derivative data exhibits a flat trend (e.g., a slope approximate to zero) and the spherical derivative data exhibits a slope of approximately $$\left(\frac{1}{2}\right).$$

Therefore, the data processing system 10 may identify a portion of the radial derivative data that exhibits a flat trend to thereby identify a portion of the pretest that corresponds to a radial flow regime.

Based on the measurement data and/or the derivative data, the data processing system 10 determines pressure as a function of a spherical time function (block 558). In general, the spherical time function may be determined based at least in part on the following equation:

$$f_s(\Delta t) = \frac{R}{\sqrt{\Delta t}} - \frac{R-1}{\sqrt{t_{2+\Delta t}}} - \frac{1}{\sqrt{t_p + \Delta t}}, \quad (1)$$

where
$\Delta t$=elasped time since start of buildup,
$R$=flow rate ratio $$\frac{q_1}{q_2}$$

of two pretests, where R=1 for limited draw down or one pretest, $t_2$=flowing time of second pretest, $t_2$=0 for one pretest,
$t_p$=total producing time.

Furthermore, if a spherical flow regime develops during a pretest, a plot of observed pressure during buildup (i.e., $f_s(\Delta t)$) may exhibit a straight line with a slope of $m_s$. In such embodiments, spherical mobility may be estimated based at least in part on the following equation:

$$\left(\frac{k}{\mu}\right)_{sp} = 1856 \left(\frac{q_1}{m_s}\right)^{\frac{2}{3}} (\phi c_t)^{\frac{1}{3}}, \quad (2)$$

where $q_1$ represents the first pretest flow rate.

Based on the measurement data and/or derivative data, the data processing system 10 determines pressure as a function of a radial time function (block 560). Generally, the radial time function may be determined based at least in part on the following equation:

$$f_r(\Delta t) = \log \frac{t_p + \Delta t}{t_2 + \Delta t} + R \times \log \frac{t_2 + \Delta t}{\Delta t}. \quad (3)$$

Generally, a radial flow regime may develop during a pretest, and a plot of the observed pressure during build-up versus $f_r(\Delta t)$ may exhibit a straight line with a slope of $m_r$. In such embodiments, a total mobility-thickness product may be determined based at least in part on the following equation:

$$\frac{kh}{\mu} = 88.1562 \frac{q_1}{|m_r|}. \quad (4)$$

As will be further appreciated, $$\frac{k}{\mu}$$

generally corresponds to the mobility of the fluid flowing from the formation. Based on a spherical flow equation of a slightly compressible fluid in a homogenous medium, a drawdown mobility $$\left(\frac{k}{\mu}\right)_d = \left(C_{pf} \times \frac{q}{\Delta p_{ss}}\right),$$

where $\Delta p_{ss}$ is the steady-state drawdown pressure drop, $C_{pf}$ is a drawdown proportionality factor, and q is the pretest flow rate. Generally, the drawdown proportionality factor is based on a type of data acquisition tool used in performing the pretest. For example, the drawdown proportionality factor for a standard/long nose probe and a standard packer may be 5660, the drawdown proportionality for a Martineau probe may be 6186, the drawdown proportionality for a large-diameter probe may be 2395, the drawdown proportionality for an X-large probe may be 1556.5, the drawdown proportionality for a large-area packer may be 1107, and/or the drawdown proportionality for a StethoScope data acquisition tool provided by Schlumberger Ltd. and its affiliates may be 4857 or 6266 depending on model. In general, drawdown mobility is based at least in part on a drawdown proportionality factor and a volume of pretest chambers for a data acquisition tool. Drawdown mobility may be determined based at least in part on the following equation:

$$\text{Drawdown Mobility} = \frac{DD_{pf} \times V_{dat}}{\sum (dT_i \times dP_i)}, \quad (5)$$

where
$DD_{pf}$ is the drawdown proportionality factor,
$V_{dat}$ is the chamber volume of the data acquisition tool, $$dT_i = T_i - T_{i-1},$$

$dP_i$=Pressure at the end of the buildup-$P_i$, and $\Sigma(dT_i \times dP_i)$ is computed for all pressures less than the final buildup pressure.

Moreover, determining a pressure derivative response for a pretest may comprise a determining a spherical time function and determining a radial time function. The data processing system may analyze the pressure derivative response to identify a portion of the pretest corresponding to a spherical flow regime and/or a portion of the pretest corresponding to a radial flow regime. As will be appreciated, determining the pressure derivative response for the pretest may comprise identifying at least a portion of the pretest that corresponds to a spherical flow regime. In addition, determining the pressure derivative response for the pretest may comprise identifying at least a portion of the pretest that corresponds to a radial flow regime.

Based on the pressure derivative response, the data processing system 10 determines whether the last-read pressure is accurate for determining the formation pressure (block 562). In general, if the portion corresponding to the spherical flow regime and the portion corresponding to the radial flow regime are identified, the pressure derivative response indicates that the last-read pressure is accurate for determining formation pressure. However, as discussed previously, a leaky seal between the data acquisition tool and the formation, poor wellbore conditions, high permeability of the formation, and/or other such conditions may lead to the fluid not exhibiting and spherical flow regime and/or a radial flow regime. In turn, the last-read pressure may not be accurate for determining the formation pressure. Therefore, in response to determining that the last-read pressure is accurate for determining formation pressure ("Y" branch of block 562), the data processing system 10 determines the formation pressure to be the last-read pressure (block 564). In response to determining that the last-read pressure is not accurate for determining the formation pressure ("N" branch of block 562), the data processing system 10 adjusts the last-read (block 566) pressure based on the pressure derivative response to thereby determine the formation pressure (block 564).

Figure 10A:
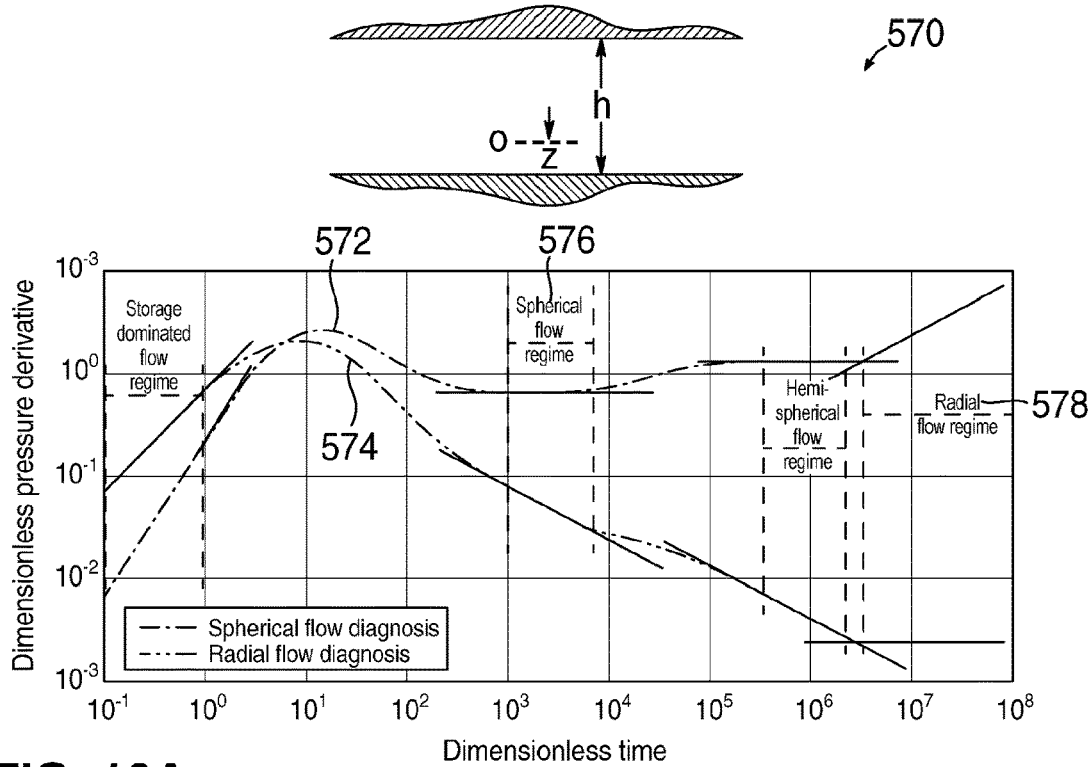
FIG. 10A provides an example chart that illustrates derivative data and a pressure derivative response that may be determined from measurement data by the data processing system of FIG. 1.
Figure 10B:
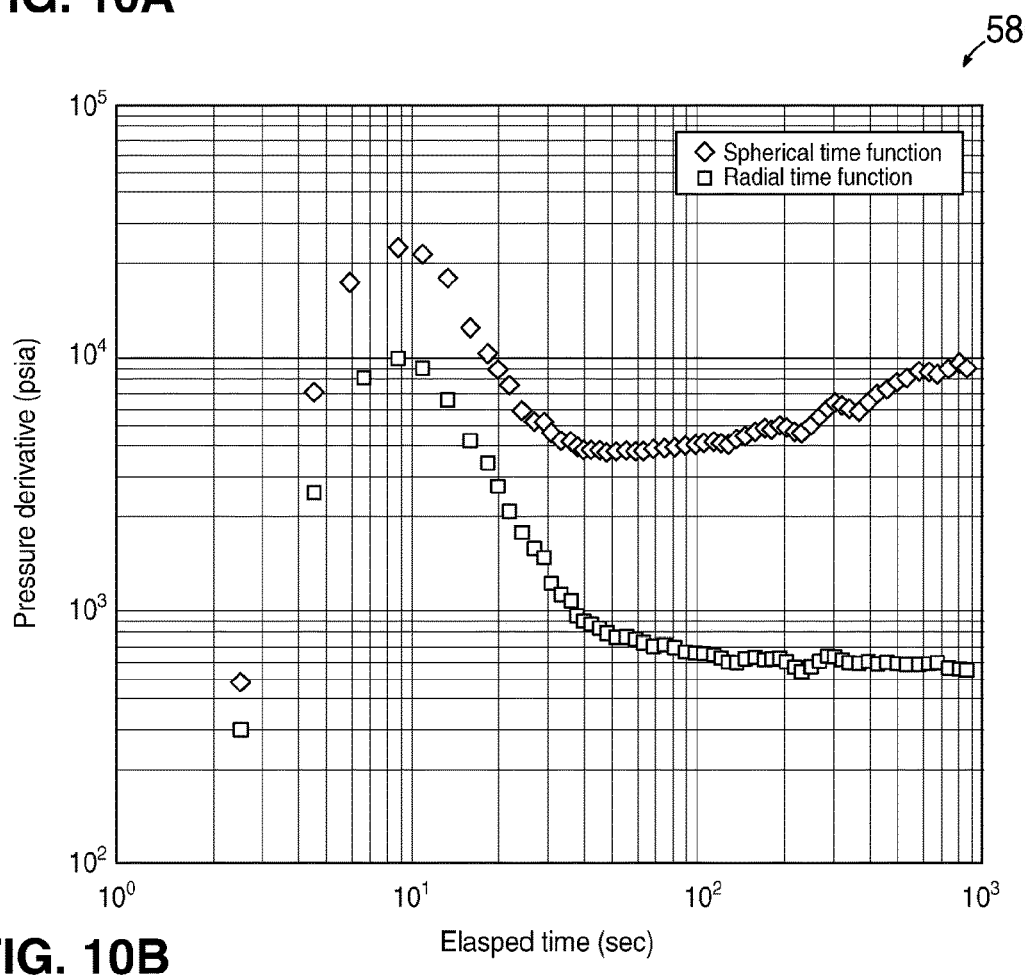
FIG. 10B provides an example chart that illustrates derivative data that may be determined by the data processing system of FIG. 1.
Figure 10C:
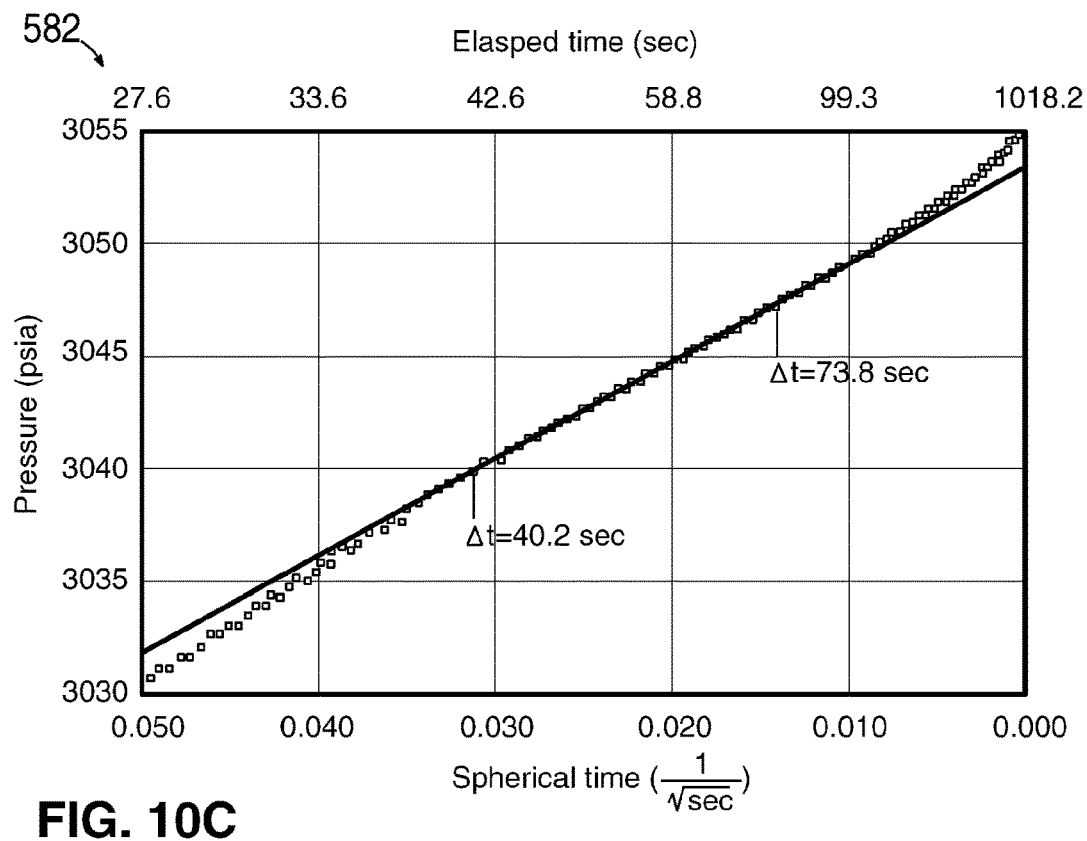
FIG. 10C provides an example chart that illustrates pressure data as a function of a spherical time function that may be analyzed by the data processing system of FIG. 1.
Figure 10D:
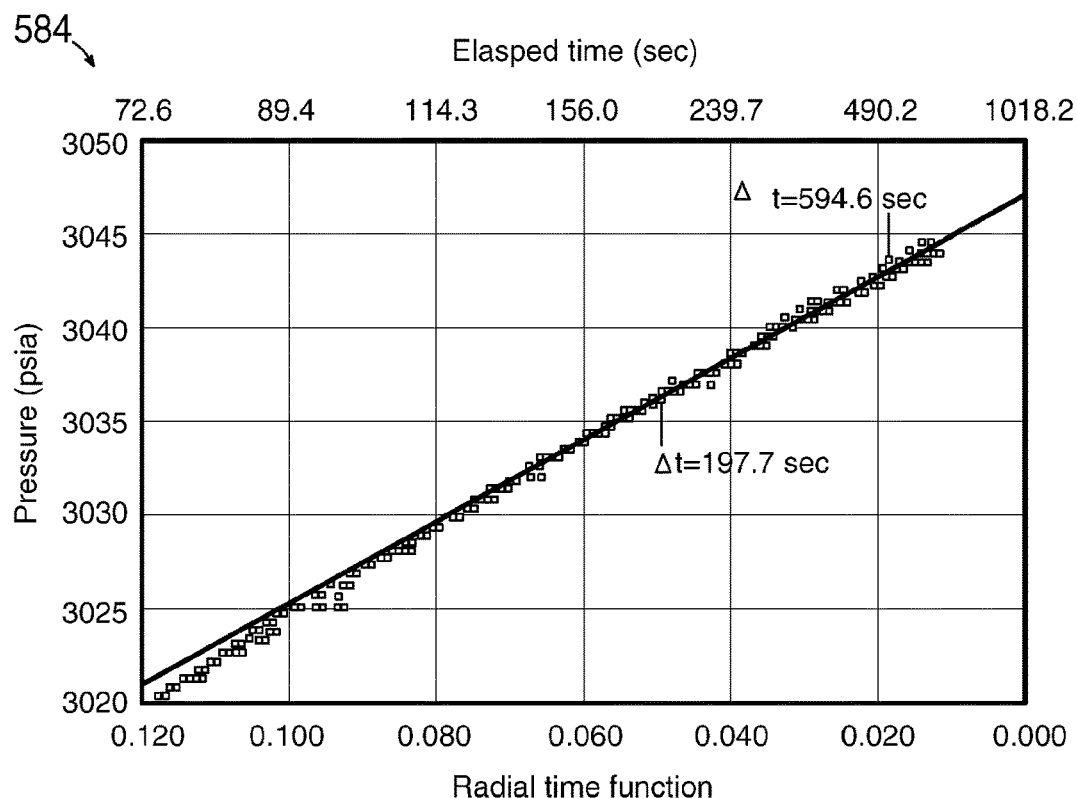
FIG. 10D provides an example chart that illustrates pressure data as a function of a radial time function that may be analyzed by the data processing system of FIG. 1.
Figure 10E:
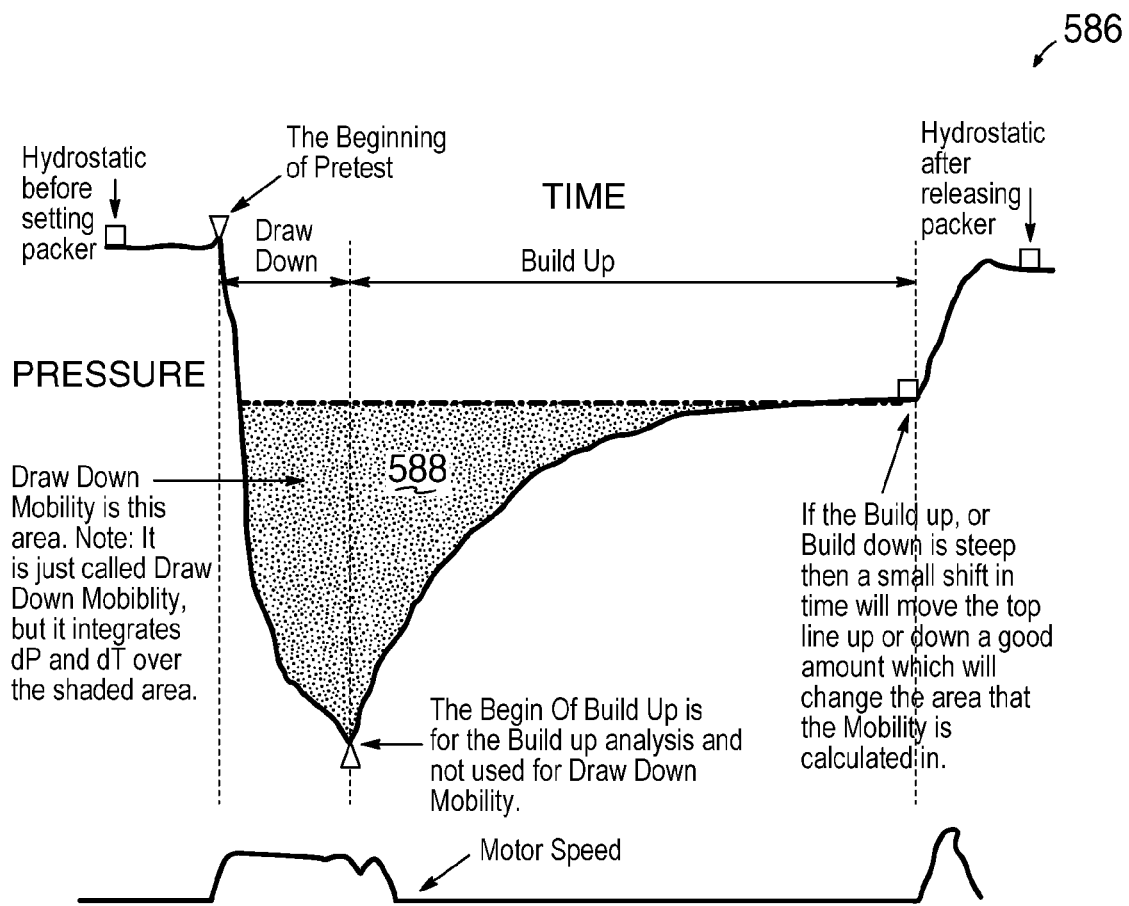
FIG. 10E provides an example chart that illustrates a drawdown mobility that may be determined by the data processing system of FIG. 1.

FIG. 10A provides an example chart 570 that illustrates pressure derivative data that includes example spherical derivative data 572 (illustrated as a dashed line) and example a radial derivative data 574 (illustrated as a solid line). As shown, the spherical derivative data exhibits a flat trend and the radial derivative data exhibits a slope of $$\left(-\frac{1}{2}\right)$$

during a portion of the pretest that exhibits a spherical flow regime 576, and the radial derivative data exhibits a flat trend and the spherical derivative data exhibits a slope of $$\left(\frac{1}{2}\right)$$

during a portion or the pretest that exhibits a radial flow regime 578. FIG. 10B provides a chart 580 that includes example derivative data that may be determined from collected measurement data, including spherical derivative data and radial derivative data. FIG. 10C provides an example chart 582 that includes pressure plotted as a function of a spherical time function (e.g., a spherical time function), and FIG. 10D provides an example chart 584 that includes pressure plotted as a function of a radial time function (e.g., a radial time function). The slope of a straight-line section of the spherical time function of FIG. 10C and the slope of a straight line-section of the radial time function may be analyzed to determine reservoir and/or formation characteristics, such as a spherical mobility, a radial mobility-thickness product, and/or an extrapolated pressure at infinite shut-in. As will be appreciated, the straight-line sections illustrated in FIGS. 10C and 10D correspond to portions of the derivative data curves that exhibit a horizontal line (e.g., the spherical flow regime 576 and the radial flow regime 578 of FIG. 10A). FIG. 10E provides an example chart 586 that illustrates the relationship of drawdown mobility 588 to a pressure versus time plot of measurement data that may be collected consistent with some embodiments.

Figure 11A:
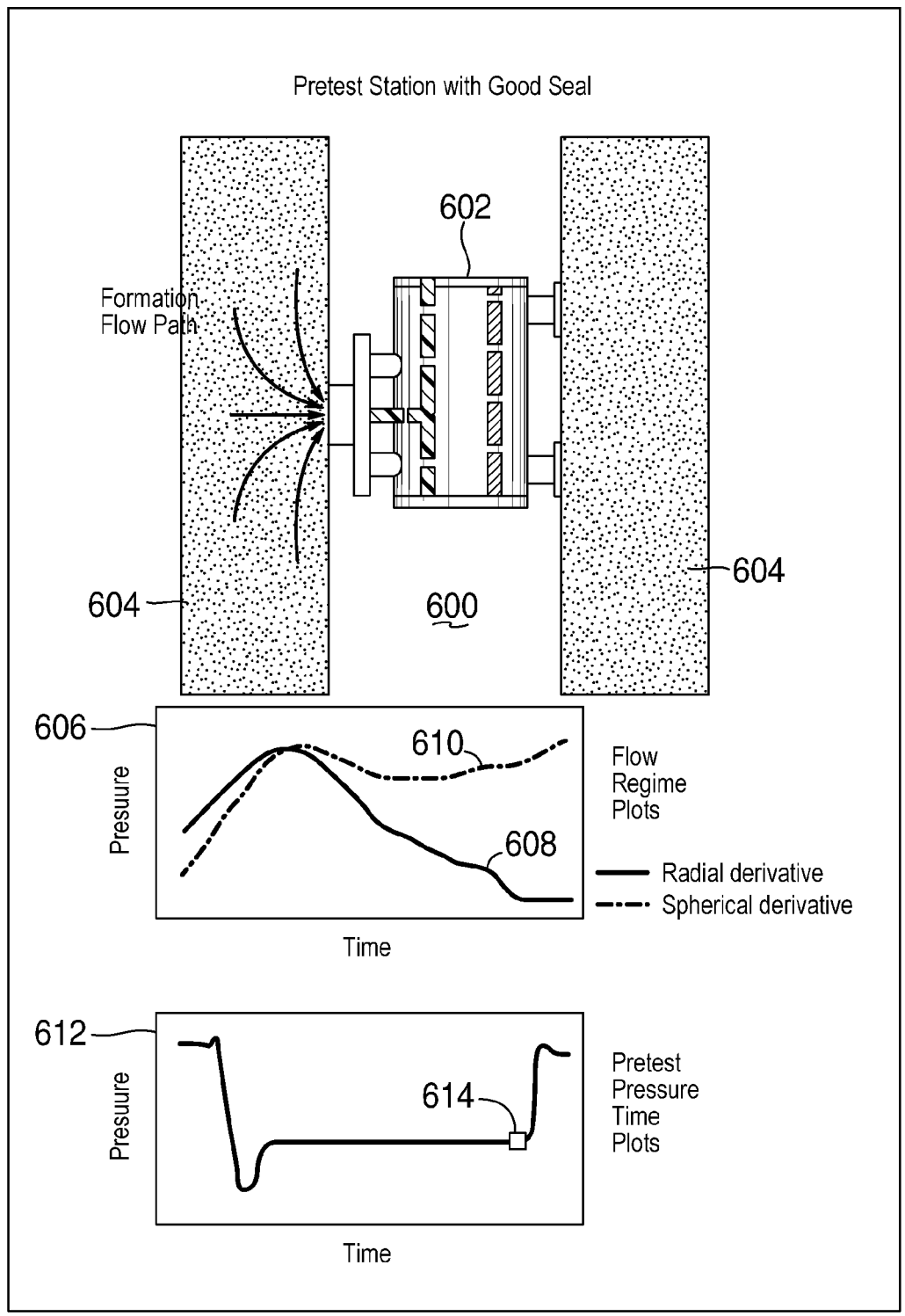
FIGS. 11A and 11B provide diagrammatic illustrations of example data acquisition tools, measurement data collected by the data acquisition tools, and derivative data that may be determined from the measurement data by the data processing system of FIG. 1.

FIG. 11A provides a diagrammatic illustration of a well 600 with a data acquisition tool 602 positioned to perform one or more pretests on a formation 604 of the well 600. In this particular example, the data acquisition tool 602 forms a seal with the formation 604. FIG. 11A further includes an example chart 606 that illustrates an example pressure derivative response for an example pretest including radial derivative data 608 and spherical derivative data 610. Furthermore, FIG. 11A includes an example chart 612 that illustrates example measurement data for the example pretest and annotates a last-read pressure 614. In this example, the measurement data and pressure derivative response indicate that the last-read pressure is accurate for determining the formation pressure.

Figure 11B:
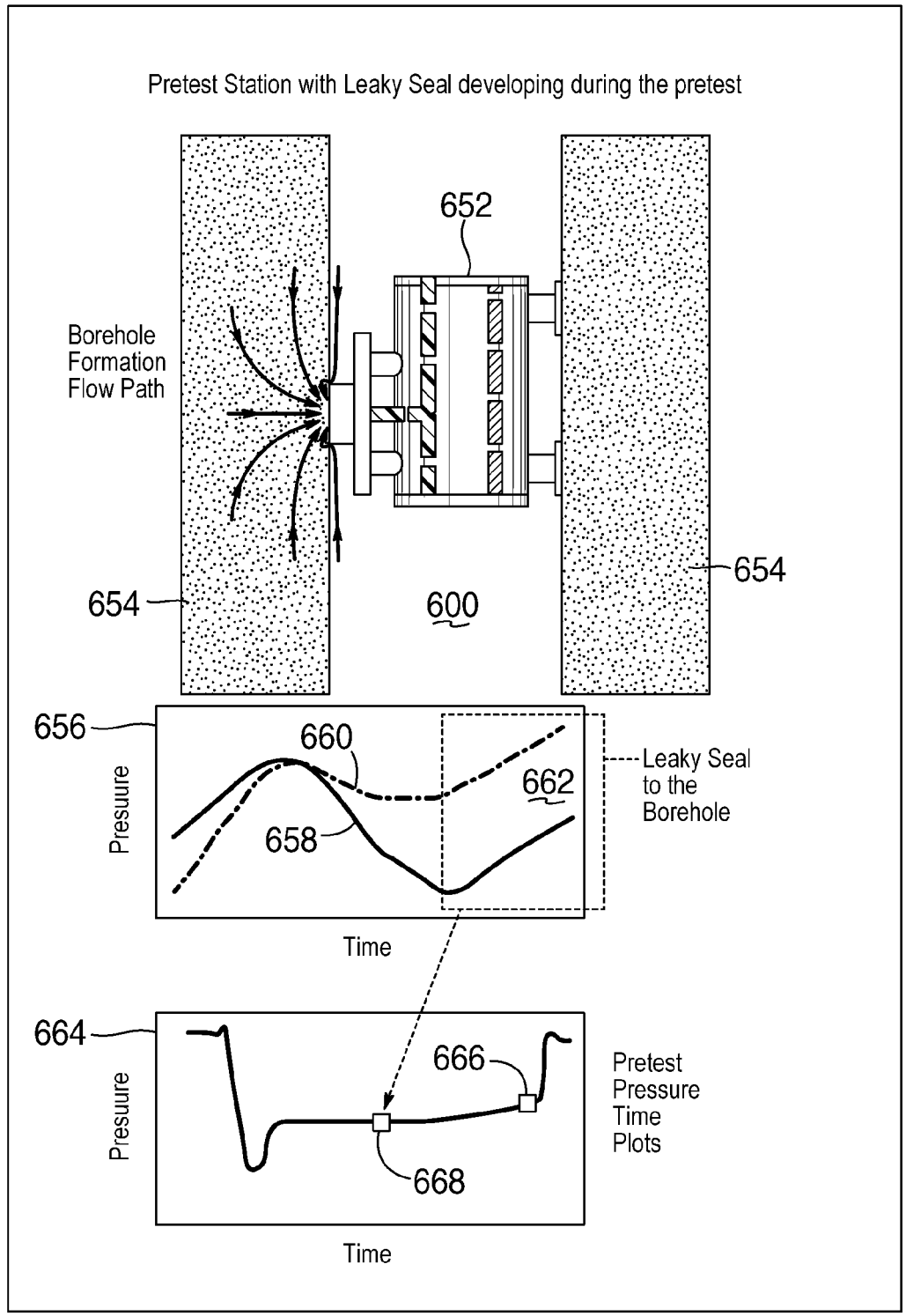

FIG. 11B provides a diagrammatic illustration of a well 650 with a data acquisition tool 652 positioned to perform one or more pretests on a formation 654 of the well 650. In this particular example, the data acquisition tool 652 forms a leaky seal with the formation 654, such that a pressure leak may develop that pulls fluid from the borehole of the well 650. FIG. 11B further includes an example chart 656 that illustrates an example pressure derivative response for an example pretest including radial derivative data 658 and spherical derivative data 660. In this example, the leaky seal has caused the radial derivative data and the spherical derivative data to exhibit different characteristics as compared to the chart 606 of FIG. 11A. In particular, an annotated region 662 annotates a point at which the pressure derivative response may be affected by the leaky seal. Furthermore, FIG. 11B includes an example chart 664 that illustrates example measurement data for the example pretest and annotates a last-read pressure 666. In this example, as discussed, the leaky seal for the data acquisition tool 652 leads to a last-read pressure 666 that is not accurate for determining the formation pressure. Consistent with embodiments, the annotated region 662 indicates that the last-read pressure is not accurate for determining formation pressure. Therefore, as shown in FIG. 11B, a formation pressure 668 is determined based on the last-read pressure 666 and the pressure derivative response. In particular, in FIG. 11B, the formation pressure 668 is determined based on the point at which the pressure derivative response indicated that the fluid flow was uncharacteristic for the pretest (e.g., the highlighted region 662).

Generally, while description is provided with regard to a pretest and determining a formation pressure, embodiments are not so limited. As will be appreciated, for a reservoir and/or a formation of the reservoir, one or more data acquisition tools may be positioned at different stations in a wellbore and configured to perform one or more pretests. A respective data acquisition tool may perform one or more pretests and a formation pressure may be determined for each pretest. Similarly, more than one data acquisition tool may perform one or more pretests of one or more formations at different stations in a wellbore of the reservoir, and a formation pressure may be determined for each position. Therefore, embodiments may determine a plurality of formation pressures for a formation of a reservoir, where such pressures generally correspond to different stations (e.g., depths) such the formation may be analyzed based on the formation pressure at each station.

Figure 12:
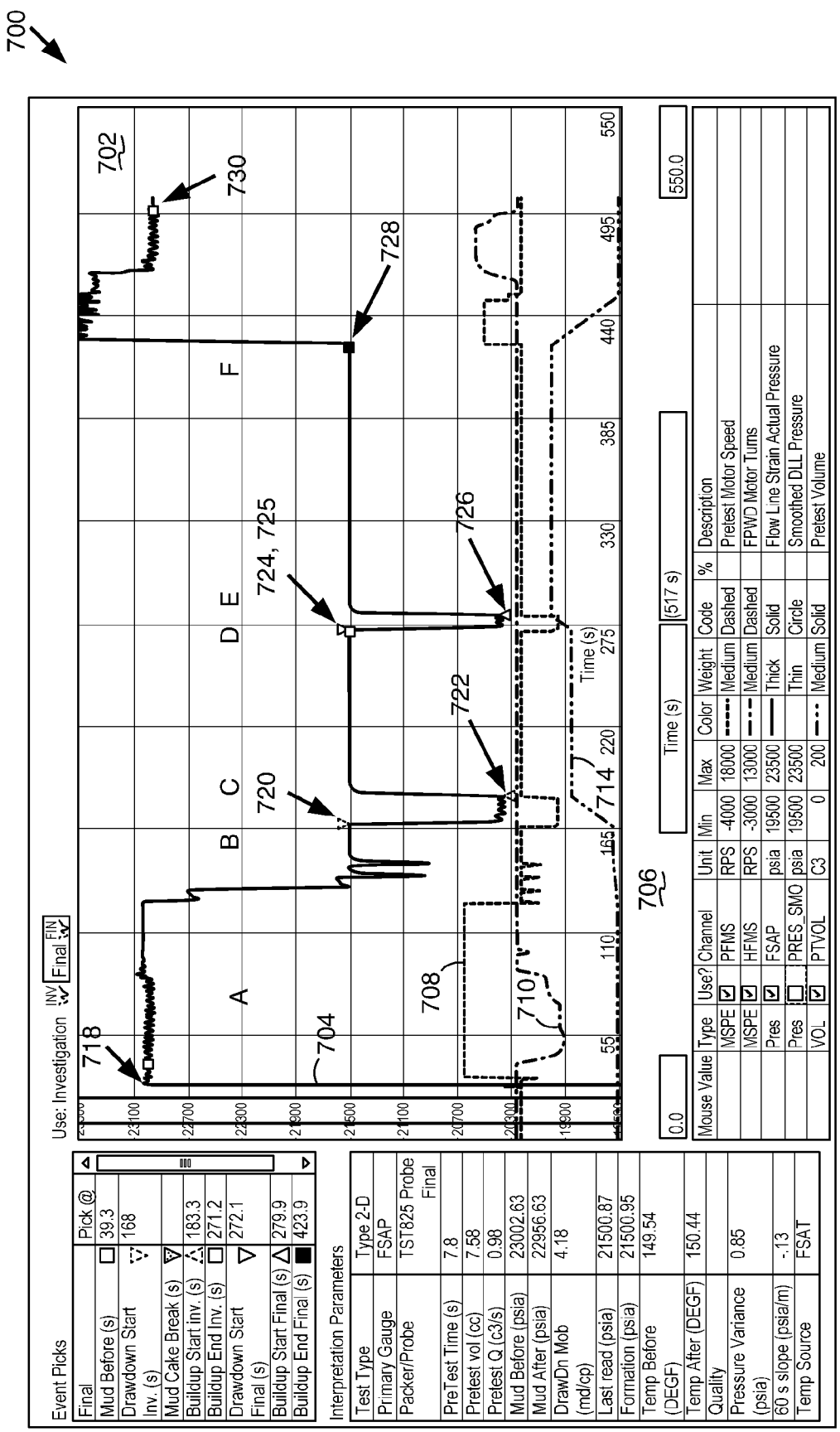
FIGS. 12-17, 18A, 18B, 18C, 19A, and 19B provide example graphical user interfaces that may be generated by the data processing system of FIG. 1.

FIG. 12 provides a diagrammatic illustration of an example graphical user interface 700 that may be generated by the data processing system 10 and output via a user interface. In this example, pressure data collected for a pretest is displayed in a chart 702 that includes pressure values 704 versus time 706. In addition, the example chart 702 includes pretest motor speed data 708, and tool setting motor direction data 710 (negative direction indicates that the data acquisition tool is setting against a formation and a positive direction indicates that the data acquisition tool is retracting from the formation), and pretest volume data 712 that is included in received measurement data. In this example, the measurement data includes pressure data collected from intervals of a (where the intervals are labeled A, B, C, D, E, and F) performed by a data acquisition tool. As shown, in interval A, a mud before event 718 occurs after the data acquisition tool positions itself for performing a pretest, as indicated by the piston motor speed 708. In interval B, a begin drawdown event 720 occurs as indicated by the piston motor speed 708 and the motor direction 710, and an increase of the pretest volume 714. A begin buildup event 722 occurs in interval C as indicated by the piston motor speed 708 and an increase in pretest volume 714. In interval D, a last-read pressure 724 for an investigative portion of the pretest occurs, and concurrently, a begin drawdown event 725 for a final portion of the pretest occurs as indicated by the piston motor speed 708 and an increase of the pretest volume 714. In interval E, a begin buildup event 726 for a final portion of the pretest occurs as indicated by the piston motor speed 708 and an increase of the pretest volume 714. In interval F, a last-read event occurs for a final portion of the pretest as indicated by the piston motor speed 708, motor direction 710, and a decrease of the pretest volume 714. In interval G, a mud after event occurs after the data acquisition tool retracts from a formation wall of the well as indicated by the piston motor speed 708 and the setting motor direction 710.

Figure 13:
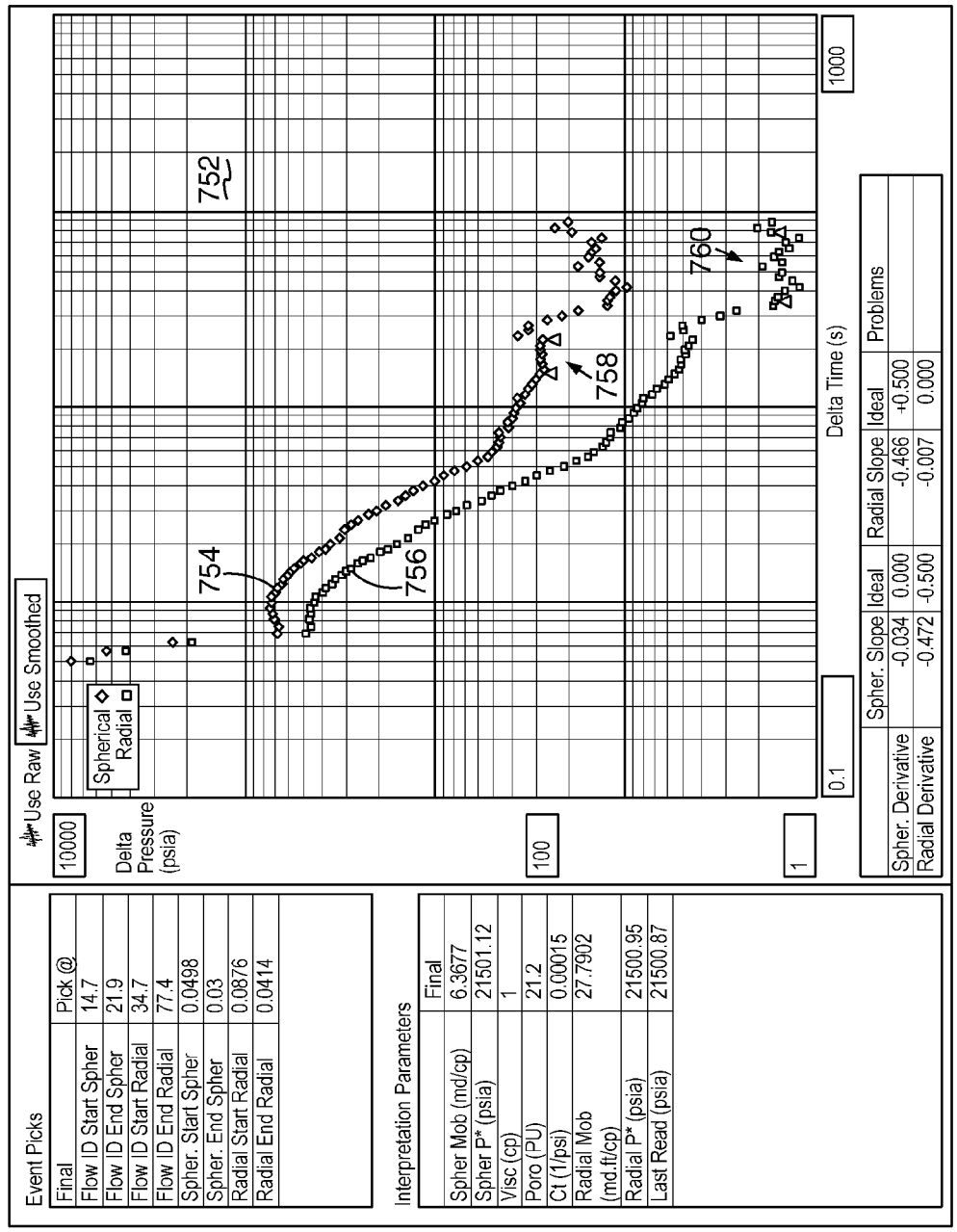

FIG. 13 provides a diagrammatic illustration of an example graphical user interface 750 that may be generated by the data processing system 10 and output via a user interface. In this example, the graphical user interface 750 includes a chart 752 that includes derivative data based on the measurement data illustrated in FIG. 12. In particular, the chart 752 includes derivative data for flow regime identification related to spherical derivative data 754 and radial derivative data 756 versus time (in this case change in time for the pretest). As will be appreciated, the spherical derivative data 754 and the radial derivative data 756 indicate a portion of the pretest that exhibits a spherical flow regime 758 and a portion of the pretest that exhibits a radial flow regime 760.

Figure 14:
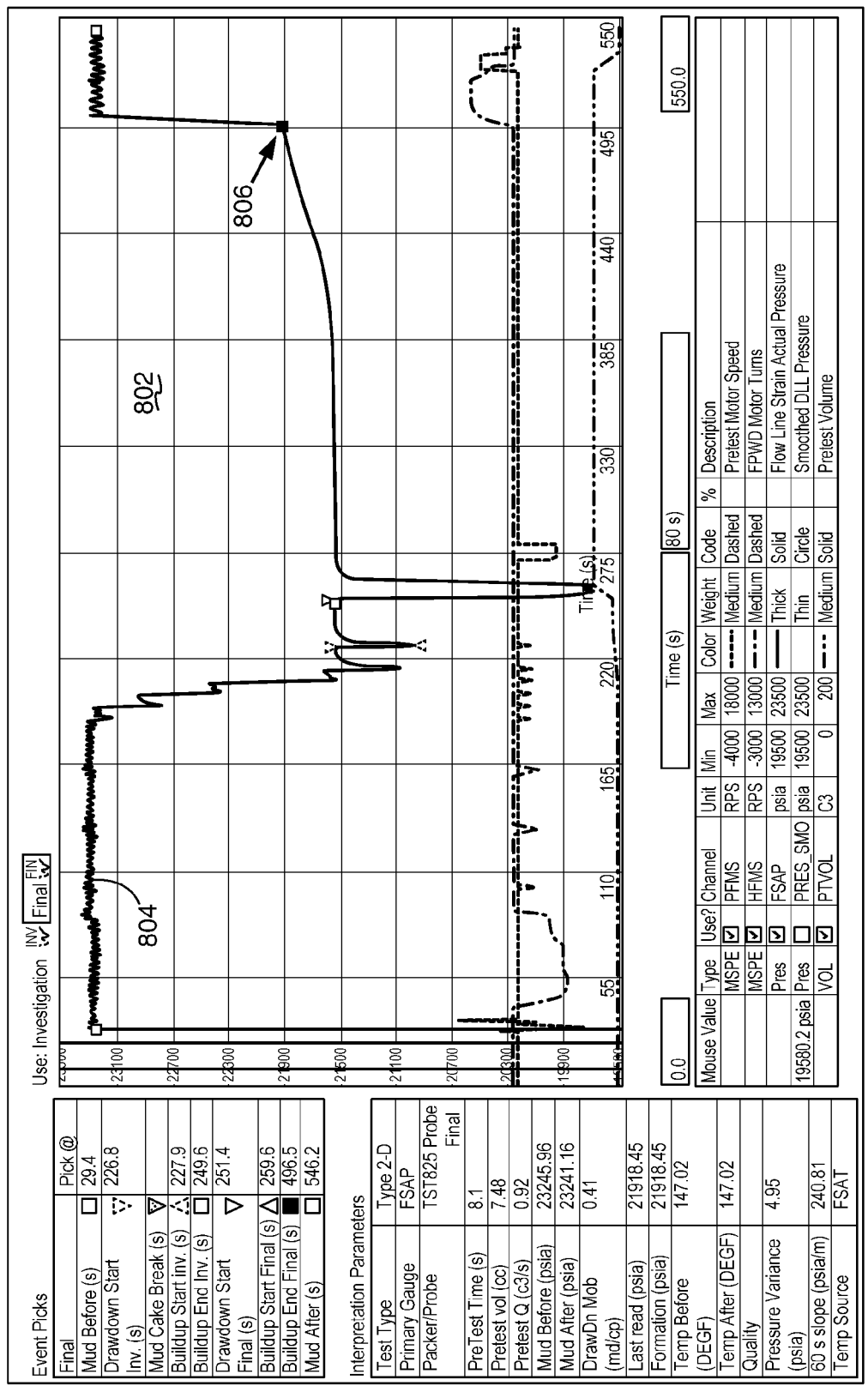
Figure 15:
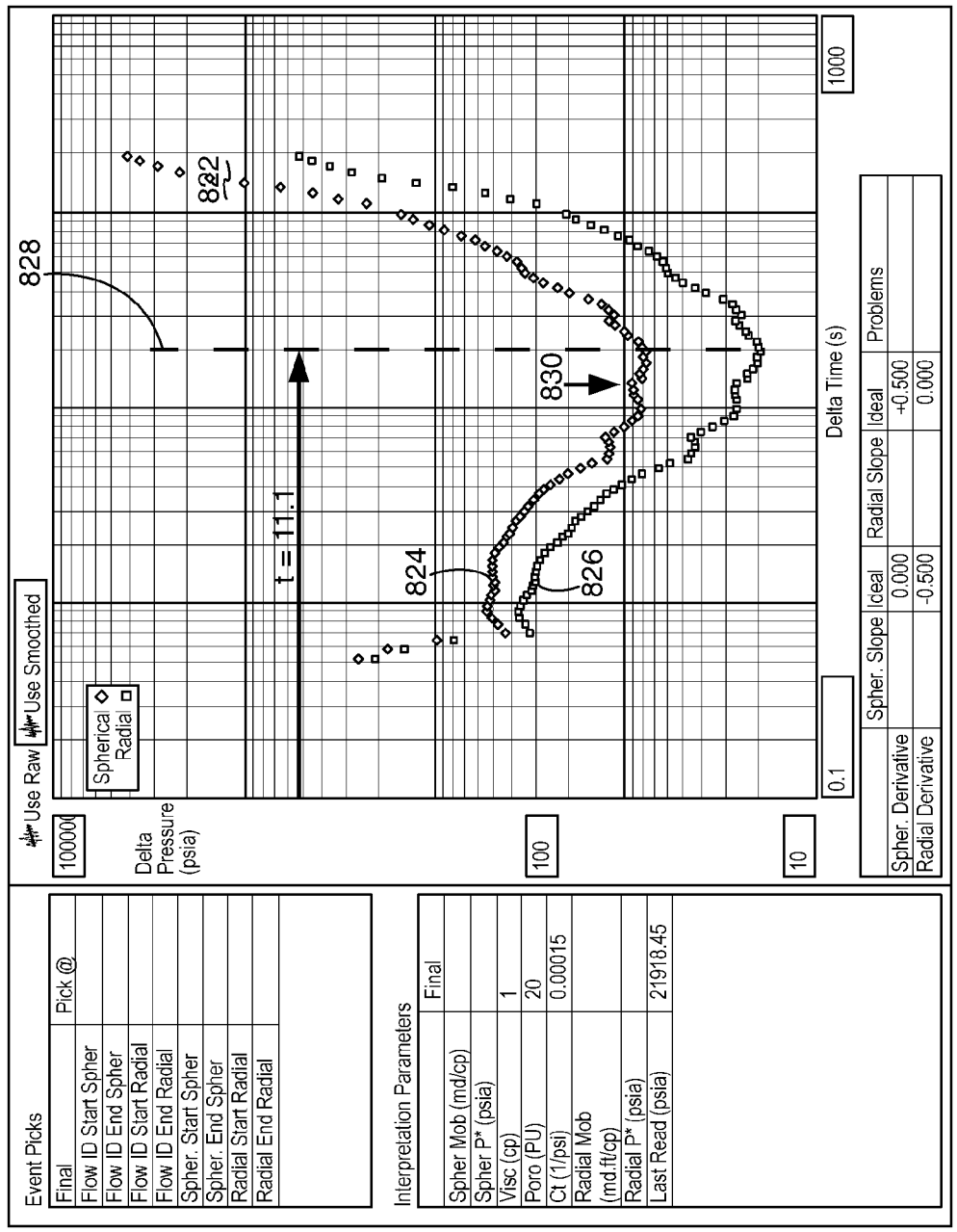

FIG. 14 provides a diagrammatic illustration of an example graphical user interface 800 that may be generated by the data processing system 10 and output via a user interface. The graphical user interface includes a chart 802 that includes time-related pressure data 804 of measurement data collected by a data acquisition tool. In this example, a seal for the data acquisition tool appears to be loose and/or leaky, such that a last-read event 806 and a corresponding last-read pressure may not be accurate for determining a formation pressure. FIG. 15 provides a diagrammatic illustration of an example graphical user interface 820 that includes derivative data based on the measurement data of FIG. 14. In particular, the graphical user interface 820 includes a chart 822 that includes spherical derivative data 824 and radial derivative data 826. In this example, due to the leaky and/or loose seal, at a time of 11.1 seconds from the time of the begin buildup event 828, the pressure derivative response for the pretest does not exhibit a formation related pressure derivative response. As shown in FIG. 15, the fluid exhibits a spherical flow regime 830; however, a radial flow regime does not occur due to the non-formation response.

Figure 16:
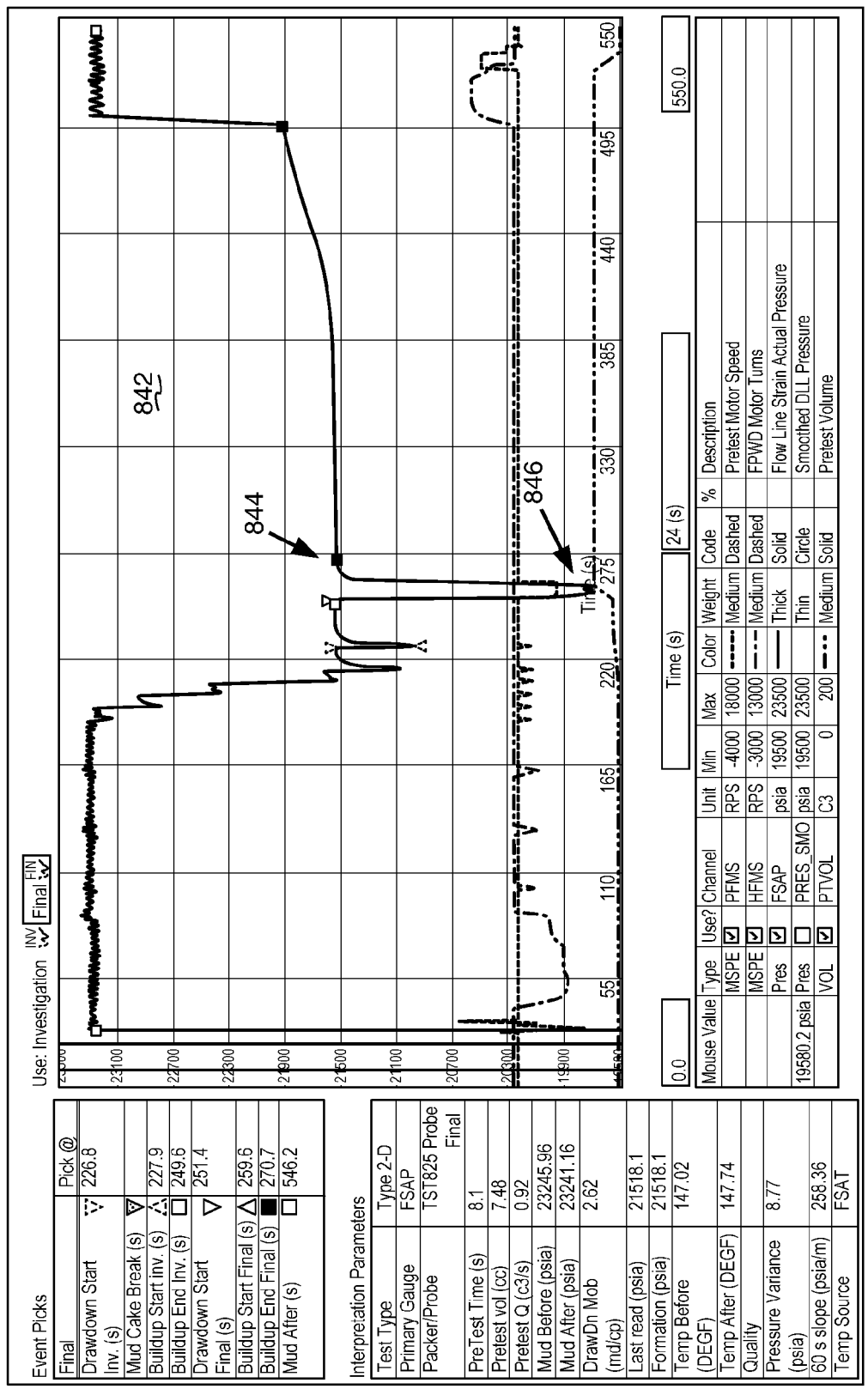
Figure 17:
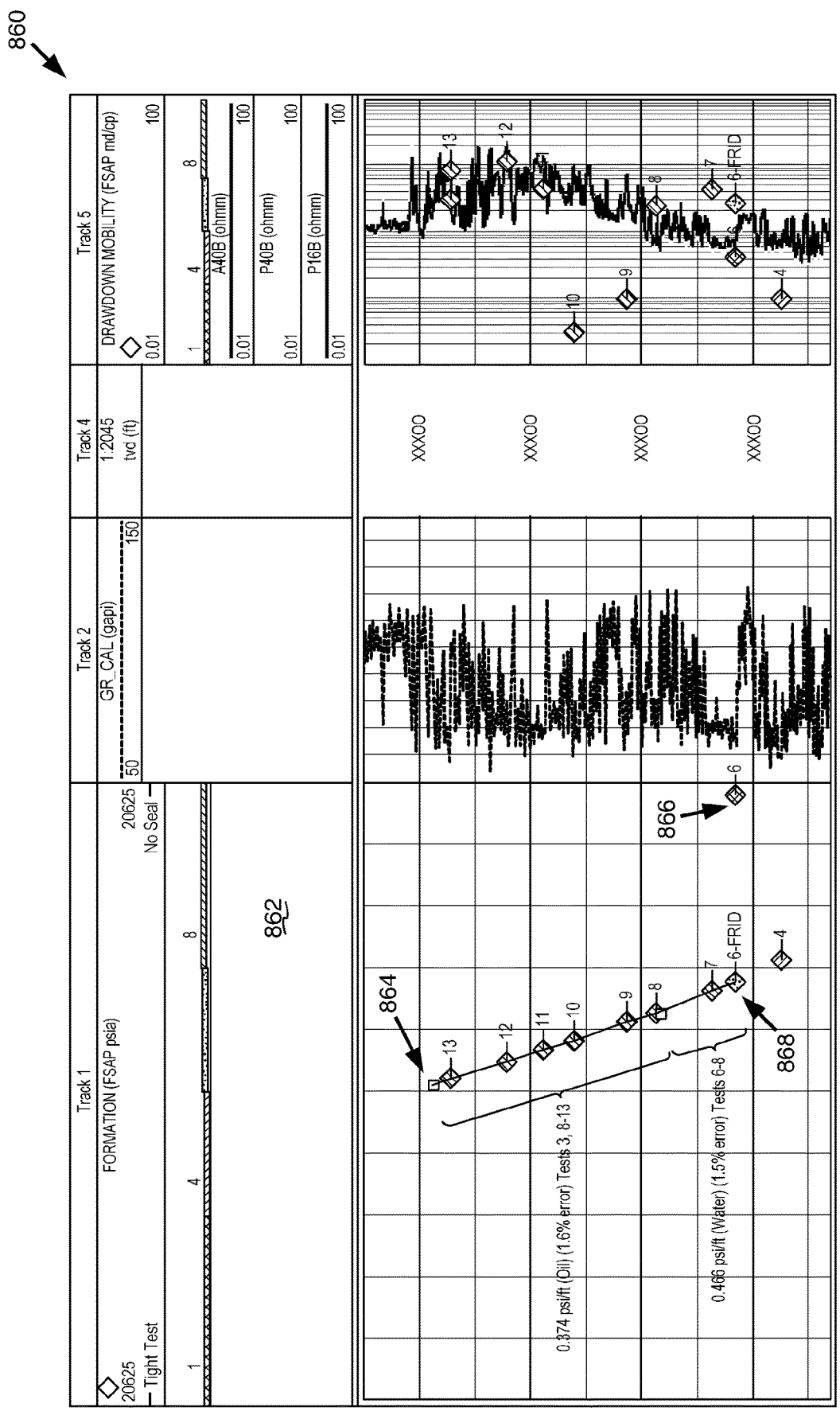

FIG. 16 provides a diagrammatic illustration of an example graphical user interface 840 that may be generated by the data processing system 10 and output via a user interface. The graphical user interface 840 includes a chart 842 that is similar to the chart 802 of FIG. 14. However, in this example, a last-read event 844 has been adjusted based on the pressure derivative response of FIG. 15. As shown, the last-read event has been adjusted to be 11.1 seconds after a begin buildup event 846 due to the pressure derivative response analyzed in FIG. 15. FIG. 17 provides a diagrammatic illustration of an example graphical user interface 860 that may be generated by the data processing system 10 and output via a user interface. The graphical user interface 860 includes a chart 862 that includes pressure gradient information 864. In this example, the pressure gradient information 864 comprises formation pressures determined for a formation of the well at different depths. In particular, the pressure gradient information 864 illustrates the determined formation pressure 866 based on the last-read event shown in FIG. 14 and the determined formation pressure 868 determined in FIG. 16 (i.e., the formation pressure determined based on the adjusted last-read event of FIG. 16).

Figure 18A:
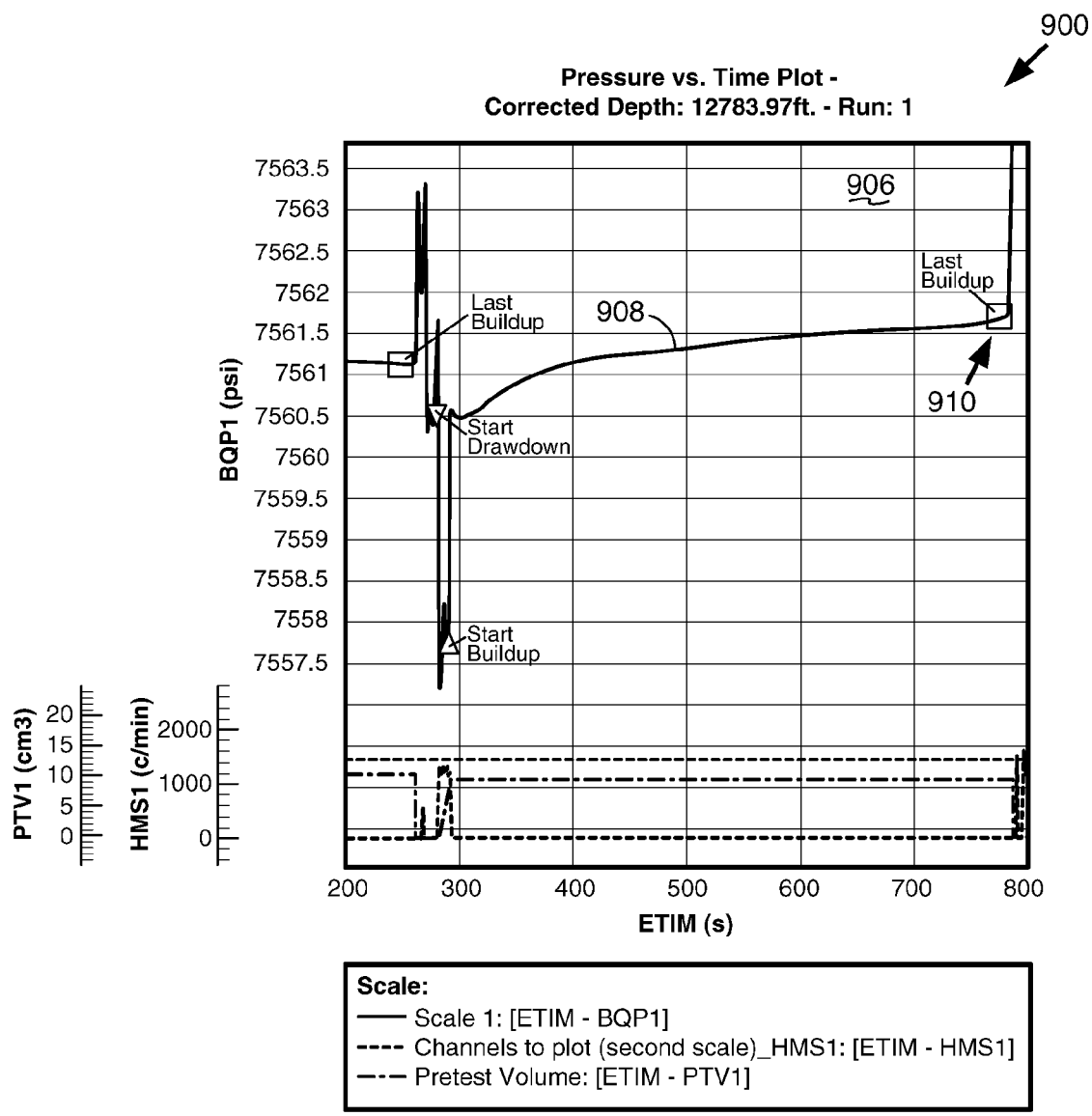
Figure 18B:
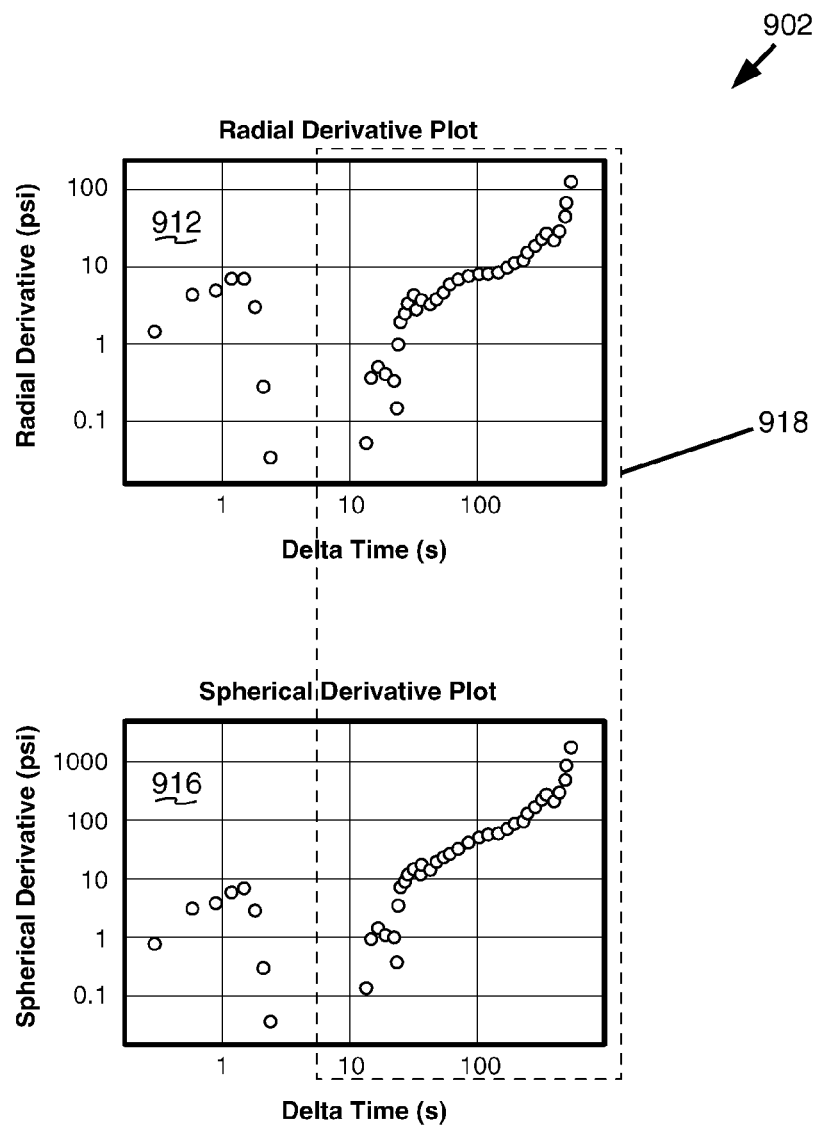
Figure 18C:
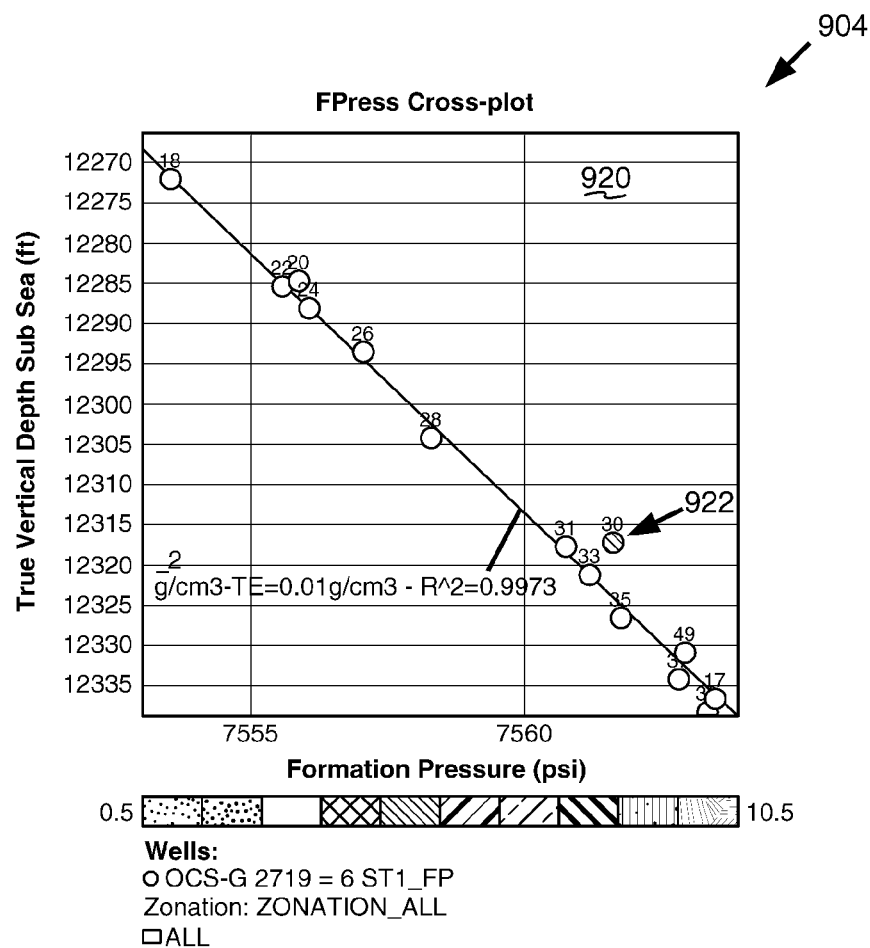

FIGS. 18A-C provide diagrammatic illustrations of example graphical user interfaces 900, 902, 904 that may be generated by the data processing system 10 and output via a user interface. In FIG. 18A, the graphical user interface 900 includes a chart 906 that includes pressure data 908 collected by a data acquisition probe. As shown, a last-read event 910 may be determined from the measurement data. The graphical user interface 902 of FIG. 18B includes a first chart 912 that includes radial derivative data and a second chart 914 that includes spherical derivative data. A highlighted region 918 of the graphical user interface corresponds to portions of the charts 912, 914 that indicate that the pressure derivative response for the pretest does not exhibit a formation related pressure derivative response—i.e., a seal of the data acquisition probe may be loose, the formation may be highly permeable, and/or other formation/wellbore conditions may have affected performance of the pretest and/or the collection of measurement data by the data acquisition tool. The graphical user interface 904 of FIG. 18C includes a chart 920 that provides formation pressure gradient information for a formation of the well at various depths. In this example, a formation pressure 922 determined from the last-read event 910 of FIG. 18A is included. As shown, the determined formation pressure 922 does not align with other formation pressures determined for other depths. As will be appreciated, the pressure derivative response illustrated in FIG. 18B indicates that the last-read event 910 of FIG. 18A is not accurate for determining a formation pressure.

Figure 19A:
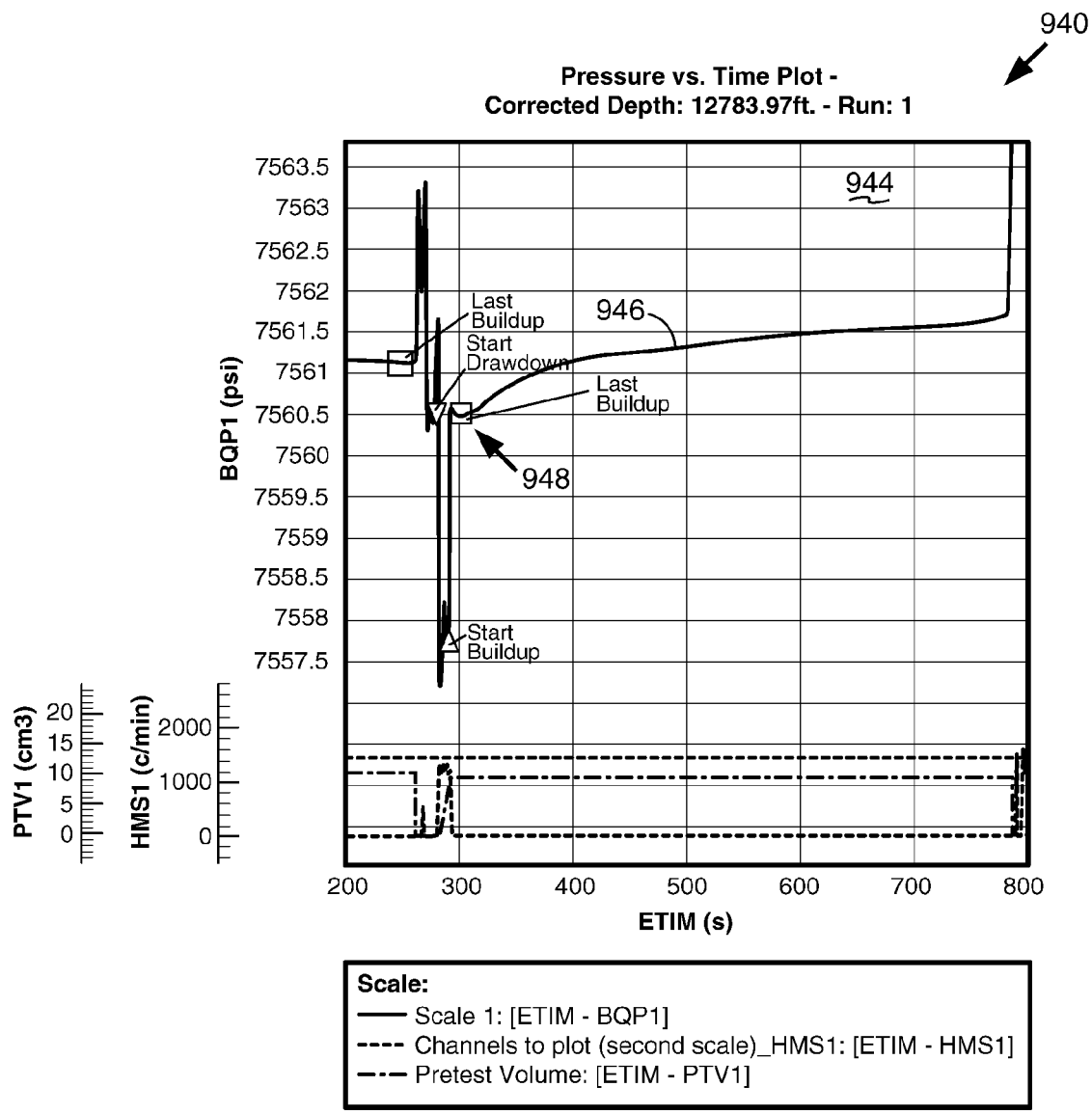
Figure 19B:
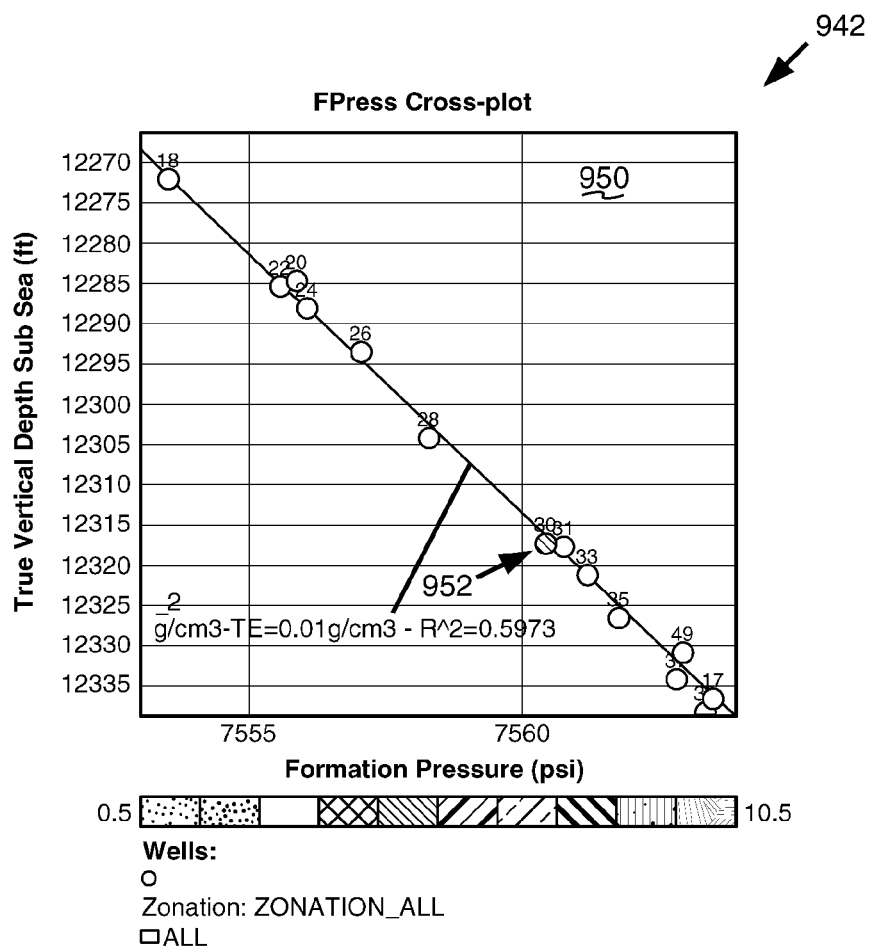

FIGS. 19A-B provide diagrammatic illustrations of example graphical user interfaces 940, 942 that may be generated by the data processing system 10 and output via a user interface. In FIG. 19A, the graphical user interface 940 comprises a chart 944 that includes time related pressure data 946 that is similar to the time related pressure data of FIG. 18A. In this example, based at least in part on the pressure derivative response, the last-read event 910 of FIG. 18A has been adjusted to an adjusted last-read event 948 of FIG. 19A. As shown in FIG. 19B, the graphical user interface 942 comprises a chart 950 that includes formation pressure gradient information (i.e., formation pressure as a function of depth). As shown, based on the adjusted last-read event 948, the formation pressure 952 determined from the adjusted last-read event 948 corresponds to the other formation pressures measured for the formation.

Figure 20A:
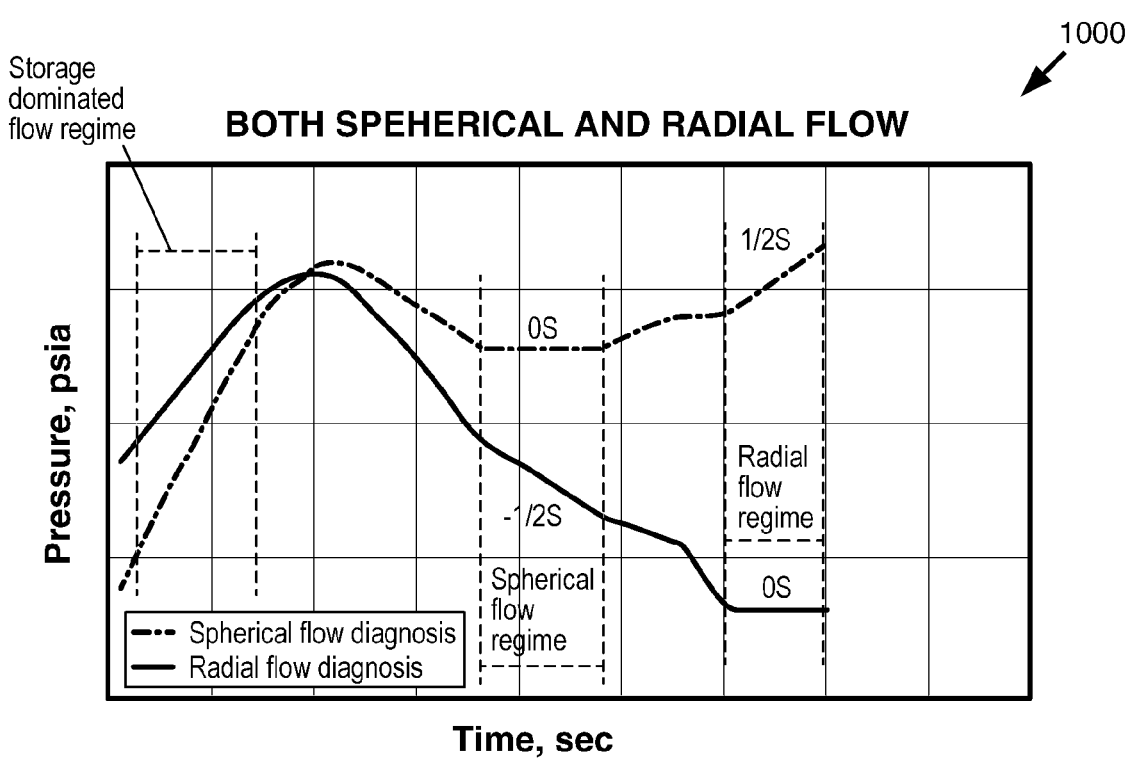
FIGS. 20A-H provide example charts that illustrate various pressure derivative responses that may be determined by the data processing system of FIG. 1. from derivative data analyzed thereby.
Figure 20B:
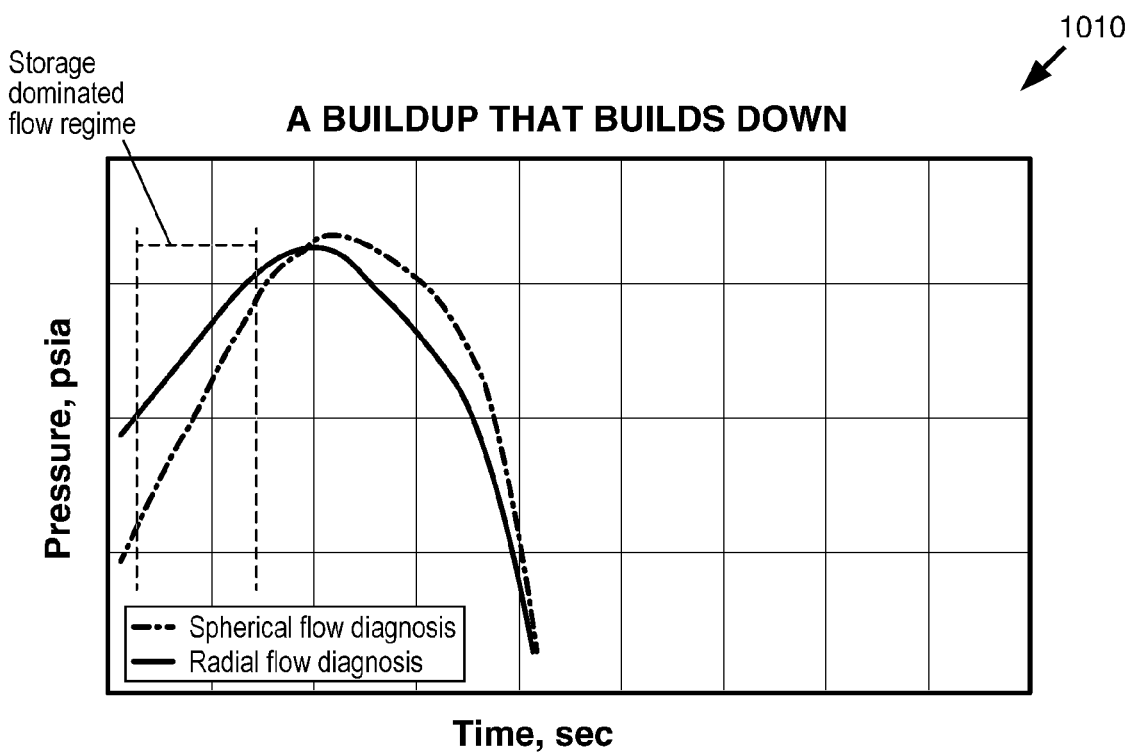
Figure 20C:
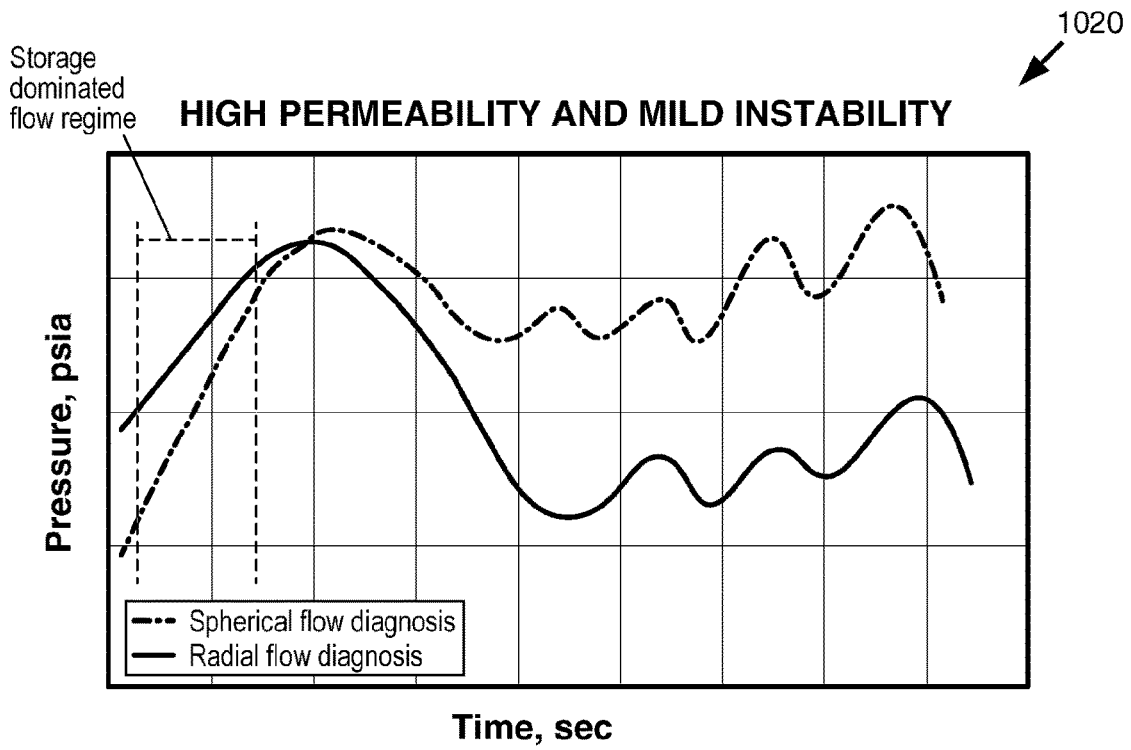
Figure 20D:
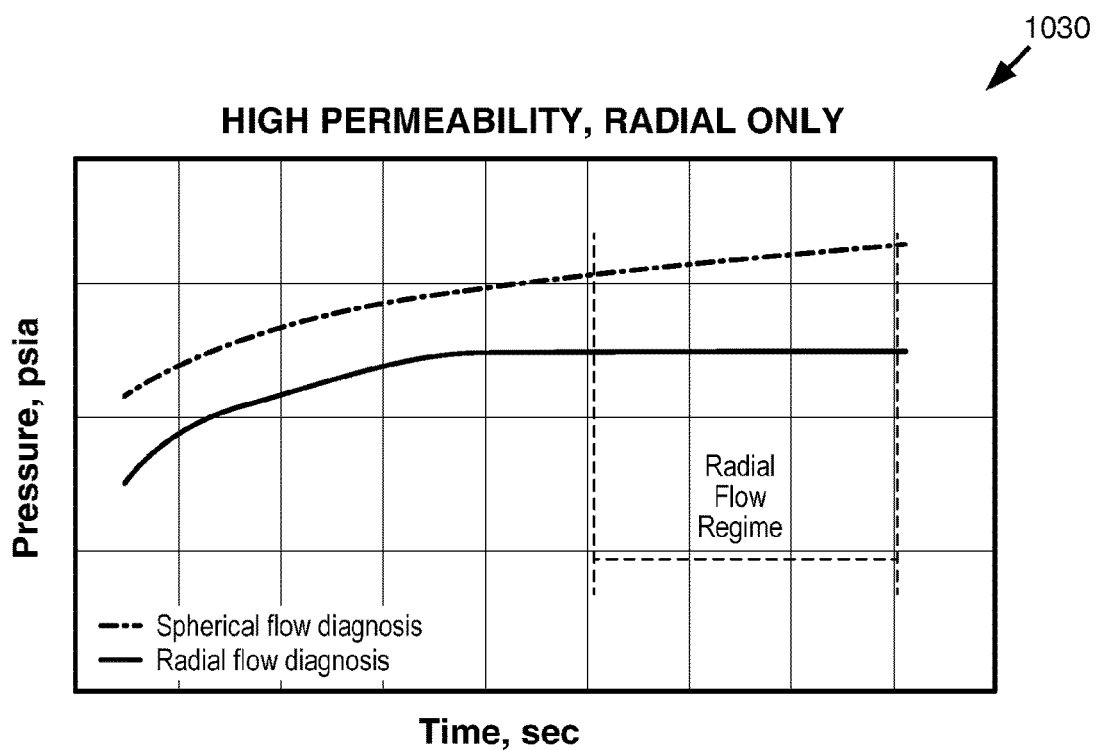
Figure 20E:
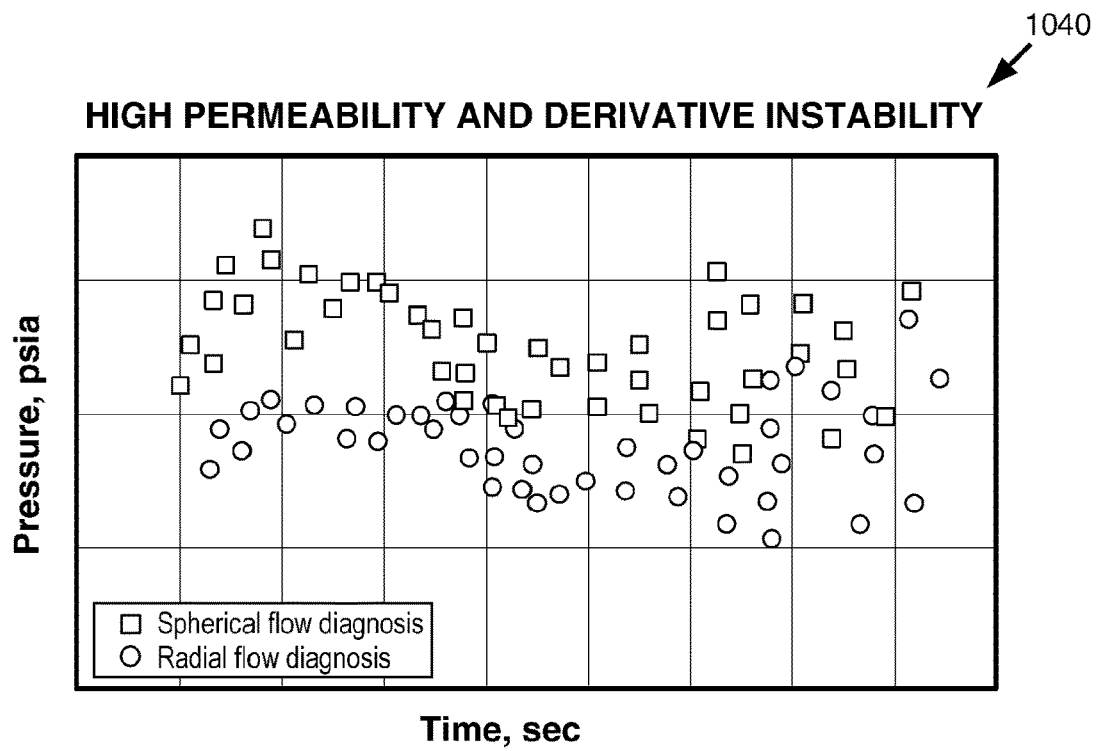
Figure 20F:
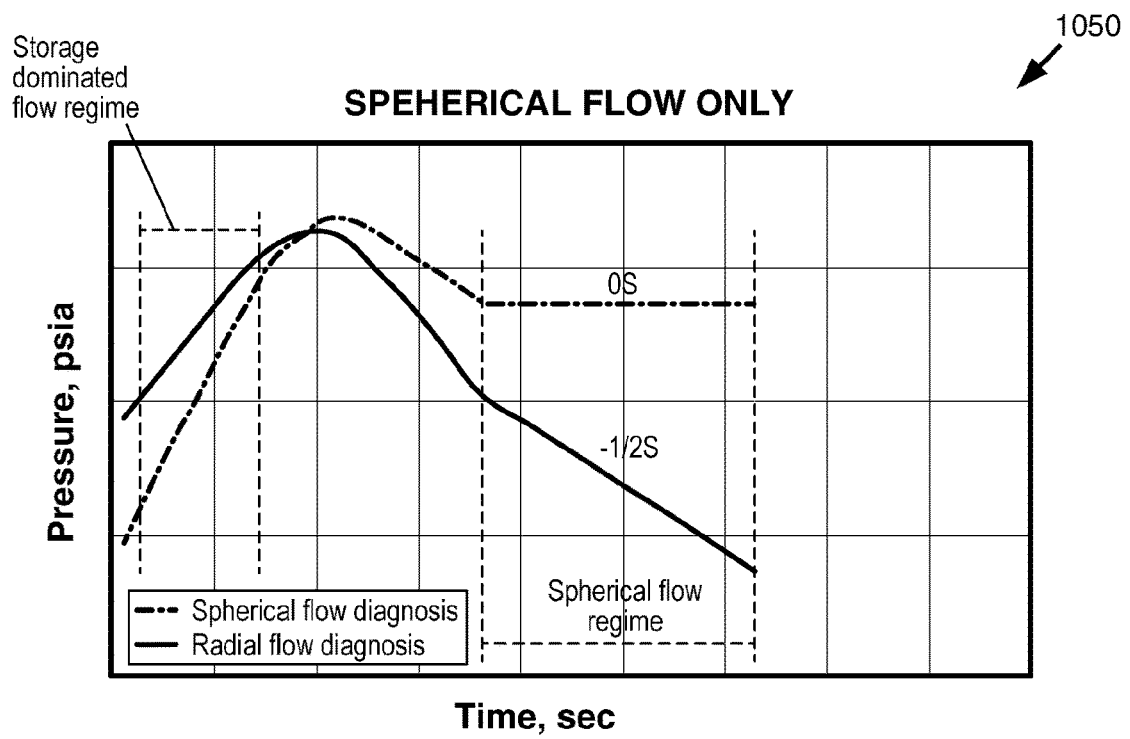
Figure 20G:
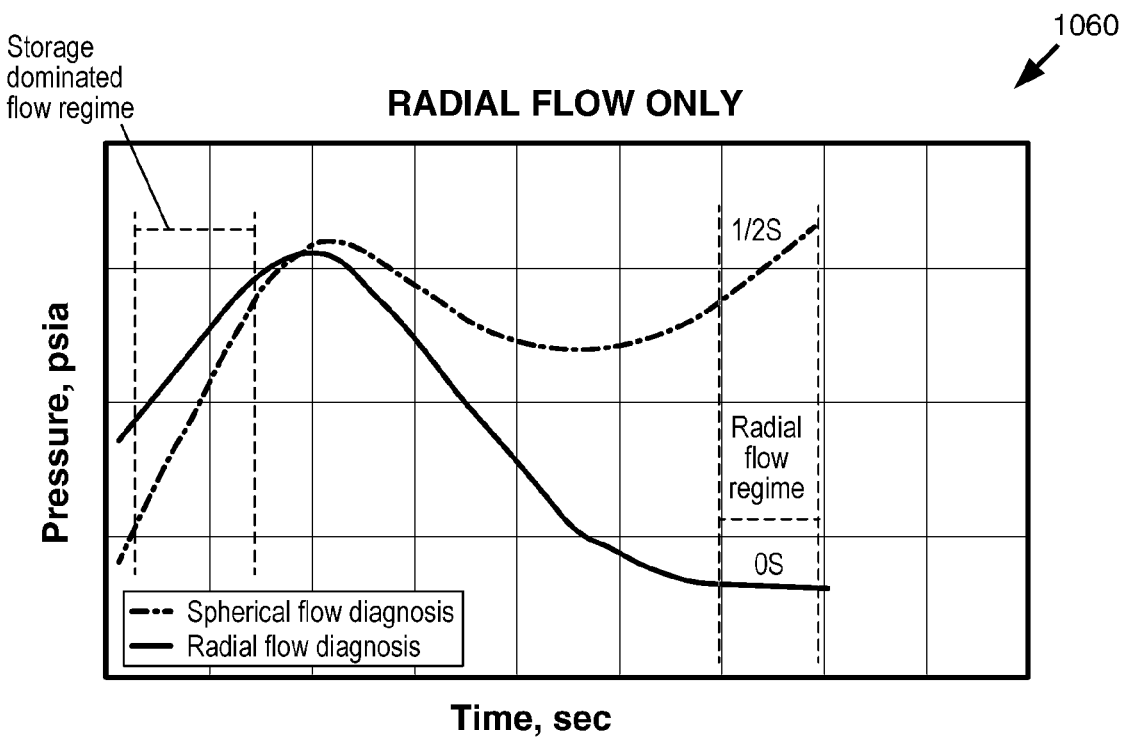
Figure 20H:
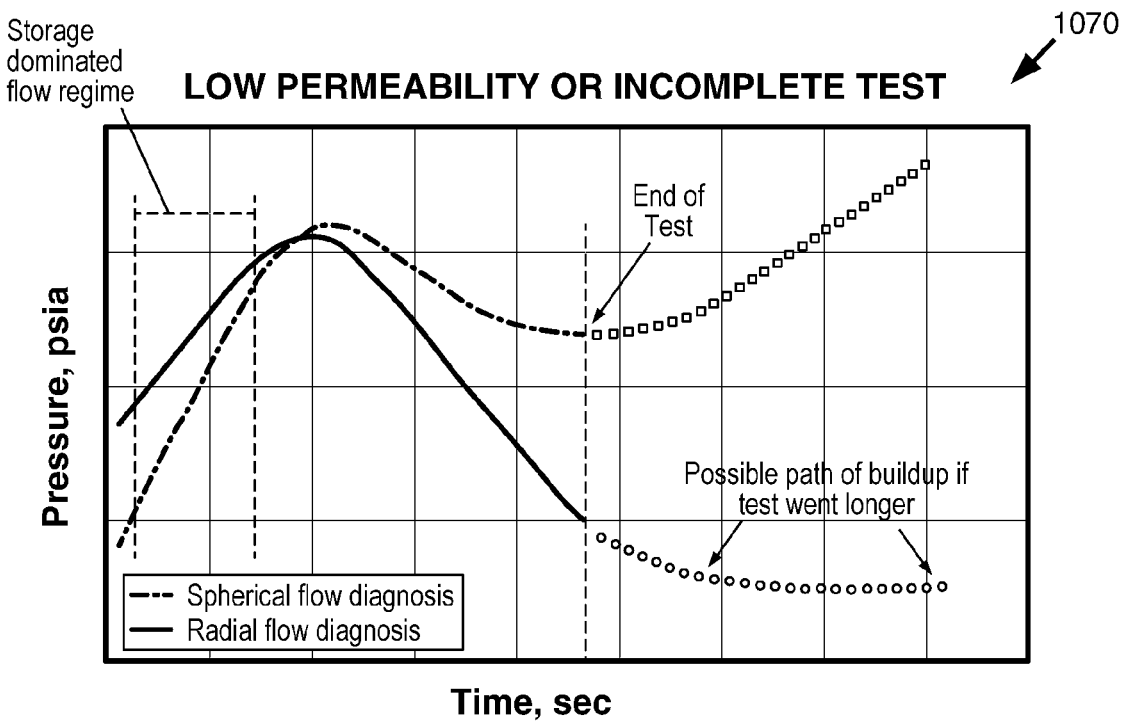

FIG. 20A provides an example chart 1000 that illustrates a pressure derivative response for a pretest that includes a portion that exhibits a spherical flow regime and a portion that exhibits a radial flow regime. FIG. 20B provides an example chart 1010 that illustrates a pressure derivative response for a pretest in which high permeability of a formation causes a pressure decrease. In such scenarios, a last-read event will not be accurate for determining the formation pressure, however, a final shut-in event and a corresponding final shut-in pressure may be used to determine the formation pressure. FIG. 20C provides an example chart 1020 that illustrates a pressure derivative response for a pretest in which high permeability and/or instability of a formation causes a wavy appearance. In such scenarios, a straight-line fit to the time function plots may be used to determine the formation pressure. FIG. 20D provides an example chart 1030 that illustrates a pressure derivative response for a pretest in which high permeability of a formation causes exhibition of only a radial flow regime. FIG. 20E provides an example chart 1040 that illustrates a pressure derivative response for a pretest in which permeability of a formation causes instability of derivative data. In such scenarios, a straight line fit may be used to extrapolate pressures, and a formation pressure may be estimated based on the extrapolated pressures. FIG. 20F provides an example chart 1050 that illustrates a pressure derivative response for a pretest in which permeability of a formation is fair, but horizontal boundaries are not encountered such that a radial flow regime is not exhibited. FIG. 20G provides an example chart 1060 that illustrates a pressure derivative response for a pretest in which permeability of a formation is such that a spherical flow regime is not exhibited. FIG. 20H provides an example chart 1070 that illustrates a pressure derivative response for a pretest in which low permeability caused insufficient development or the buildup was stopped prematurely.

Therefore, consistent with some embodiments, a formation pressure for a formation of an oil and gas reservoir may be determined based at least in part on a last-read event, a last-read pressure, and/or a pressure derivative response. Generally, analysis of the pressure derivative response may indicate whether a last-read pressure is accurate for determining formation pressure. Furthermore, embodiments may adjust a last-read event and the corresponding last-read pressure based at least in part on the pressure derivative response to thereby facilitate the determination of an accurate formation pressure. As will be appreciated, formation pressures determined at different depths of a wellbore associated with the reservoir may be analyzed to determine a formation pressure gradient for the formation of the reservoir.

While particular embodiments have been described, it is not intended that the embodiments be limited thereto, as it is intended that embodiments are as broad in scope as the art will allow and that the specification be read likewise. It will therefore be appreciated by those skilled in the art that yet other modifications could be made without deviating from its spirit and scope as claimed.

What is claimed is:

1. A method of determining a formation pressure for a reservoir, the method comprising:
   receiving measurement data for a pretest of a formation of the reservoir from a data acquisition tool;
   analyzing, with at least one processor of a data processing system, the measurement data to determine a last-read event and a corresponding last-read pressure for the pretest;
   determining, with the at least one processor, derivative data for a flow regime identification based at least in part on the measurement data;
   analyzing, with the at least one processor, the derivative data to determine a pressure derivative response, wherein analyzing the derivative data comprises determining whether the pressure derivative response represents both a radial flow regime and a spherical flow regime; and
   determining, with the at least one processor, the formation pressure for the formation based at least in part on the last-read event, the last-read pressure, and the pressure derivative response wherein determining the formation pressure comprises:
      determining that the last-read pressure is representative of the formation pressure when the pressure derivative response represents both the radial flow regime and the spherical flow regime; and
      determining that an alternative pressure, other than the last-read pressure, is representative of the radial flow regime when the pressure derivative response does not represent both the radial flow regime and the spherical flow regime.

2. The method of claim 1, wherein determining the derivative data comprises:
   determining spherical derivative data from the measurement data, wherein the pressure derivative response is determined based at least in part on the spherical derivative data.

3. The method of claim 2, wherein analyzing the derivative data to determine the pressure derivative response comprises:

calculating a spherical time function based in part on the measurement data;

calculating the pressure data as a function of the spherical time function; and analyzing the spherical derivative data to identify a portion of the pretest corresponding to a spherical flow regime based in part on a slope of the pressure data as a function of the spherical time function, and the formation pressure for the formation is determined based at least in part on the portion of the pretest corresponding to the spherical flow regime.

4. The method of claim 1, wherein determining the derivative data comprises:

determining a radial derivative data from the measurement data, wherein the pressure derivative response is determined based in part on the radial derivative data.

5. The method of claim 4, wherein analyzing the derivative data to determine the pressure derivative response comprises:

calculating a radial time function based in part on the measurement data;

calculating the pressure data as a function of the radial time function; and analyzing the radial derivative data to identify a portion of the pretest corresponding to a radial flow regime based on a slope of the pressure data as a function of the radial time function, and the formation pressure is determined based at least in part on the portion of the pretest corresponding to the radial flow regime.

6. The method of claim 1, further comprising:

determining a formation pressure gradient for the formation based at least in part on the formation pressure.

7. The method of claim 1, wherein analyzing the derivative data to determine the pressure derivative response comprises:

determining a spherical time function and a radial time function based in part on the the measurement data, determining a spherical derivative data based on the pressure data and the spherical time function; and determining a radial derivative data based on the pressure data and the radial time function, wherein the formation pressure is determined based at least in part on a slope of the pressure data as a function of the spherical time function, and a slope of the pressure data as a function of the radial time function.

8. The method of claim 1, wherein analyzing the derivative data comprises representing a at least one portion of the derivative data as a linear regression that represents the radial flow regime or the spherical flow regime.

9. The method of claim 1, wherein determining that the alternative pressure is representative of the formation pressure comprises selecting a pressure measured during an elapsed time of the pretest, prior to a time at which the last-read pressure is measured.

10. The method of claim 9, wherein selecting the pressure measured during the elapsed time, prior to the time at which last-read pressure is measured, comprises:

determining a time during the elapsed time of the pretest at which the pressure derivative response does not exhibit a formation-related pressure derivative response; and selecting a pressure measured prior to the time at which the pressure derivative response does not exhibit a formation-related pressure derivative response as the alternative pressure.

11. A data processing system, comprising:
at least one processor;
a memory coupled with the at least one processor; and
program code stored on the memory and configured to be executed by the at least one processor to cause the at least one processor to:

receive measurement data for a pretest of a formation of a reservoir from a data acquisition tool, analyze the measurement data to determine a last-read event and a corresponding last-read pressure for the pretest;

determine derivative data for a flow regime identification based at least in part on the measurement data;

analyze the derivative data to determine a pressure derivative response for the pretest, wherein analyzing the derivative data comprises determining that the pressure derivative data represents a radial flow regime and a spherical flow regime; and determine a formation pressure for the formation based at least in part on the last-read event, the last-read pressure, and the pressure derivative response, wherein determining the formation pressure comprises:

determining that the last-read pressure is representative of the formation pressure when the pressure derivative response represents both the radial flow regime and the spherical flow regime; and determining that an alternative pressure, other than the last-read pressure, is representative of the radial flow regime when the pressure derivative response does not represent both the radial flow regime and the spherical flow regime.

12. The data processing system of claim 11, wherein the derivative data is determined by:

determining spherical derivative data from the measurement data, wherein the pressure derivative response is determined based at least in part on the spherical derivative data.

13. The data processing system of claim 12, wherein the derivative data is analyzed to determine the pressure derivative response by:

calculating a spherical time function based in part on the measurement data;

calculating the pressure data as a function of the spherical time function; and analyzing the spherical derivative data to identify a portion of the pretest corresponding to a spherical flow regime based in part on a slope of the pressure data as a function of the spherical time function, and the formation pressure for the formation is determined based at least in part on the portion of the pretest corresponding to the spherical flow regime.

14. The data processing system of claim 11, wherein the derivative data is determined by:

determining radial derivative data from the measurement data, wherein the pressure derivative response is determined based in part on the radial derivative data.

15. The data processing system of claim 14, wherein the derivative data is analyzed to determine the pressure derivative response by:

calculating a radial time function based in part on the measurement data;

calculating the pressure data as a function of the radial time function; and analyzing the radial derivative data to identify a portion of the pretest corresponding to a radial flow regime based in part on a slope of the pressure data as a function of the radial time function, and the formation pressure is determined based at least in part on the portion of the pretest corresponding to the radial flow regime.

16. A computer program product comprising:
a computer readable storage medium; and
program code stored on the computer readable storage medium and configured, upon execution, to cause at least one processor to:
  receive measurement data for a pretest of a formation of a reservoir from a data acquisition tool,
  analyze the measurement data to determine a last-read event and a corresponding last-read pressure for the pretest;
  determine derivative data for a flow regime identification based at least in part on the measurement data;
  analyze the derivative data to determine a pressure derivative response for the pretest, wherein analyzing the derivative data comprises determining that the pressure derivative data represents both a radial flow regime and a spherical flow regime; and
  determine a formation pressure for the formation based at least in part on the last-read event, the last-read pressure, and the pressure derivative response, wherein determining the formation pressure comprises:
    determining that the last-read pressure is representative of the formation pressure when the pressure derivative response represents both the radial flow regime and the spherical flow regime; and
    determining that an alternative pressure, other than the last-read pressure, is representative of the radial flow regime when the pressure derivative response does not represent both the radial flow regime and the spherical flow regime.

* * * * *